US010431786B2

(12) United States Patent
Kuboki et al.

(10) Patent No.: US 10,431,786 B2
(45) Date of Patent: Oct. 1, 2019

(54) ELECTRICITY STORAGE MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hideyuki Kuboki, Mie (JP); Hiroki Hirai, Mie (JP); Tomoyuki Sakata, Mie (JP); Makoto Higashikozono, Mie (JP); Kenji Nakagawa, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 25 days.

(21) Appl. No.: 15/538,152

(22) PCT Filed: Dec. 7, 2015

(86) PCT No.: PCT/JP2015/084274
§ 371 (c)(1),
(2) Date: Jun. 20, 2017

(87) PCT Pub. No.: WO2016/104123
PCT Pub. Date: Jun. 30, 2016

(65) Prior Publication Data
US 2017/0352851 A1   Dec. 7, 2017

(30) Foreign Application Priority Data

Dec. 22, 2014  (JP) .................................. 2014-258320

(51) Int. Cl.
*H02J 7/00* (2006.01)
*H01M 2/10* (2006.01)
(Continued)

(52) U.S. Cl.
CPC ....... *H01M 2/1077* (2013.01); *H01M 2/0207* (2013.01); *H01M 2/10* (2013.01);
(Continued)

(58) Field of Classification Search
CPC ......... Y02E 60/12; H02J 7/0068; H02J 7/022; H02J 7/0031; H01M 10/44
(Continued)

(56) References Cited

U.S. PATENT DOCUMENTS

| 2003/0162091 A1* | 8/2003 | Watanabe | ........... H01M 2/0262 |
| | | | 429/156 |
| 2005/0079408 A1* | 4/2005 | Hirano | ................ B60L 11/1874 |
| | | | 429/82 |

(Continued)

FOREIGN PATENT DOCUMENTS

| JP | 2007172893 A | 7/2007 |
| JP | 2012123980 A | 6/2012 |

(Continued)

OTHER PUBLICATIONS

International Search Report for Application No. PCT/JP2015/084274 dated Feb. 2, 2016, 7 pages.
(Continued)

*Primary Examiner* — Arun C Williams
(74) *Attorney, Agent, or Firm* — Reising Ethington, P.C.

(57) ABSTRACT

An electricity storage module that includes: a plurality of electricity storage elements each including positive and negative lead terminals protruding outward from end portions thereof; a stack in which the plurality of electricity storage are stacked and adjacent ones of the lead terminals (Continued)

of opposite polarities are connected to each other; bus bars that are individually connected to those of the lead terminals connected in order that are located at opposite ends and that have mutually opposite polarities; and voltage detection terminals that are connected to terminal ends of voltage detection lines and individually connected to the electricity storage elements, wherein the lead terminals, the bus bars, and the voltage detection terminals are collectively connected by laser welding.

3 Claims, 25 Drawing Sheets

(51) Int. Cl.
　　　H01M 2/20　　　(2006.01)
　　　H01M 2/30　　　(2006.01)
　　　H01M 2/34　　　(2006.01)
　　　H01M 2/02　　　(2006.01)
　　　H01M 2/26　　　(2006.01)
(52) U.S. Cl.
　　　CPC ............ *H01M 2/20* (2013.01); *H01M 2/206* (2013.01); *H01M 2/266* (2013.01); *H01M 2/30* (2013.01); *H01M 2/305* (2013.01); *H01M 2/34* (2013.01)
(58) Field of Classification Search
　　　USPC .......................................................... 320/128
　　　See application file for complete search history.

(56) References Cited

U.S. PATENT DOCUMENTS

| 2007/0141457 | A1 | 6/2007 | Amagai |
| 2009/0139781 | A1* | 6/2009 | Straubel .............. B60L 11/1875 180/65.1 |
| 2013/0149577 | A1 | 6/2013 | Lee |
| 2014/0248516 | A1 | 9/2014 | Yoshioka |
| 2015/0228942 | A1 | 8/2015 | Shimoda |
| 2017/0069898 | A1 | 3/2017 | Shimizu |

FOREIGN PATENT DOCUMENTS

| JP | 2012134016 A | 7/2012 |
| JP | 2012138268 A | 7/2012 |
| JP | 2012195305 A | 10/2012 |
| JP | 2013105698 A | 5/2013 |
| JP | 2013539175 A | 10/2013 |
| JP | 2014078366 A | 5/2014 |
| JP | 2015167104 A | 9/2015 |

OTHER PUBLICATIONS

International Search Authority for Application No. PCT/JP2015/084274, 5 pages.

* cited by examiner

ELECTRICITY STORAGE MODULE

CROSS REFERENCE TO RELATED APPLICATIONS

This application claims the priority of Japanese patent application JP2014-258320 filed on Dec. 22, 2014, the entire contents of which are incorporated herein.

TECHNICAL FIELD

The technology disclosed herein relates to an electricity storage module such as a battery module.

BACKGROUND ART

As an example of conventional battery modules, a battery module described in JP 2014-78366A (Patent Document 1 JP 2014-78366A) is known. This battery module has a structure in which a plurality of electric cells each including positive and negative lead terminals protruding outward from end portions thereof are stacked and adjacent lead terminals of opposite polarities are connected to each other, a pair of bus bars that are individually connected to those of the lead terminals connected in order that are located at opposite ends and that have mutually opposite polarities, and voltage detection terminals connected to terminal ends of voltage detection lines are individually connected for the lead terminals.

SUMMARY

With the above-described conventional example, at the portion where adjacent lead terminals are connected, the lead terminals are each substantially L-shaped and are bent toward the other lead terminal, and the bent portions are overlapped and welded, thereby attempting to speed up the connection operation and to reduce the size of the stack. However, the operation of connecting the voltage detection terminals to the lead terminals needs to be performed separately. In particular, the lead terminals located at opposite ends further require the operation to connect the bus bars thereto, and thus the assembly step is still complex. Accordingly, there is a strong demand for a further improvement.

The technology disclosed herein is directed to an electricity storage module including: a plurality of electricity storage elements each including positive and negative lead terminals protruding outward from end portions thereof; a stack in which the plurality of electricity storage elements are stacked and adjacent ones of the lead terminals of opposite polarities are connected to each other; bus bars that are individually connected to those of the lead terminals connected in order that are located at opposite ends and that have mutually opposite polarities; and voltage detection terminals that are connected to terminal ends of voltage detection lines and individually connected to the electricity storage elements, wherein the lead terminals, the bus bars, and the voltage detection terminals are collectively connected by laser welding.

This configuration allows the bus bar and the voltage detection terminal to be collectively connected to the corresponding lead terminal, so that it is possible to simplify the assembly step, thus contributing to the reduction in the manufacturing costs.

The technology disclosed herein may have the following configuration.

An insulating separator interposed between adjacent ones of the lead terminals is further provided, and the bus bars and the voltage detection terminals can be mounted to the separator so as to be positioned at a position that overlaps welding portions respectively provided at the lead terminals.

With this configuration, the lead terminals, the bus bars, and the voltage detection terminals are held on the separator while being normally overlapped, making it possible to further smoothly perform the subsequent laser welding operation.

The voltage detection lines and the voltage detection terminals may be connected via fuses. This configuration can prevent an excessively large current from flowing to the voltage detection lines.

With the technology disclosed herein, it is possible to provide an electricity storage module for which the manufacturing process can be further simplified.

DESCRIPTION OF EMBODIMENT

Hereinafter, an embodiment applied to a battery module M will be described with reference to FIGS. 1 to 25. The battery module M according to the present embodiment is used for an ISG (Integrated Starter Generator), for example.

Figure 1:
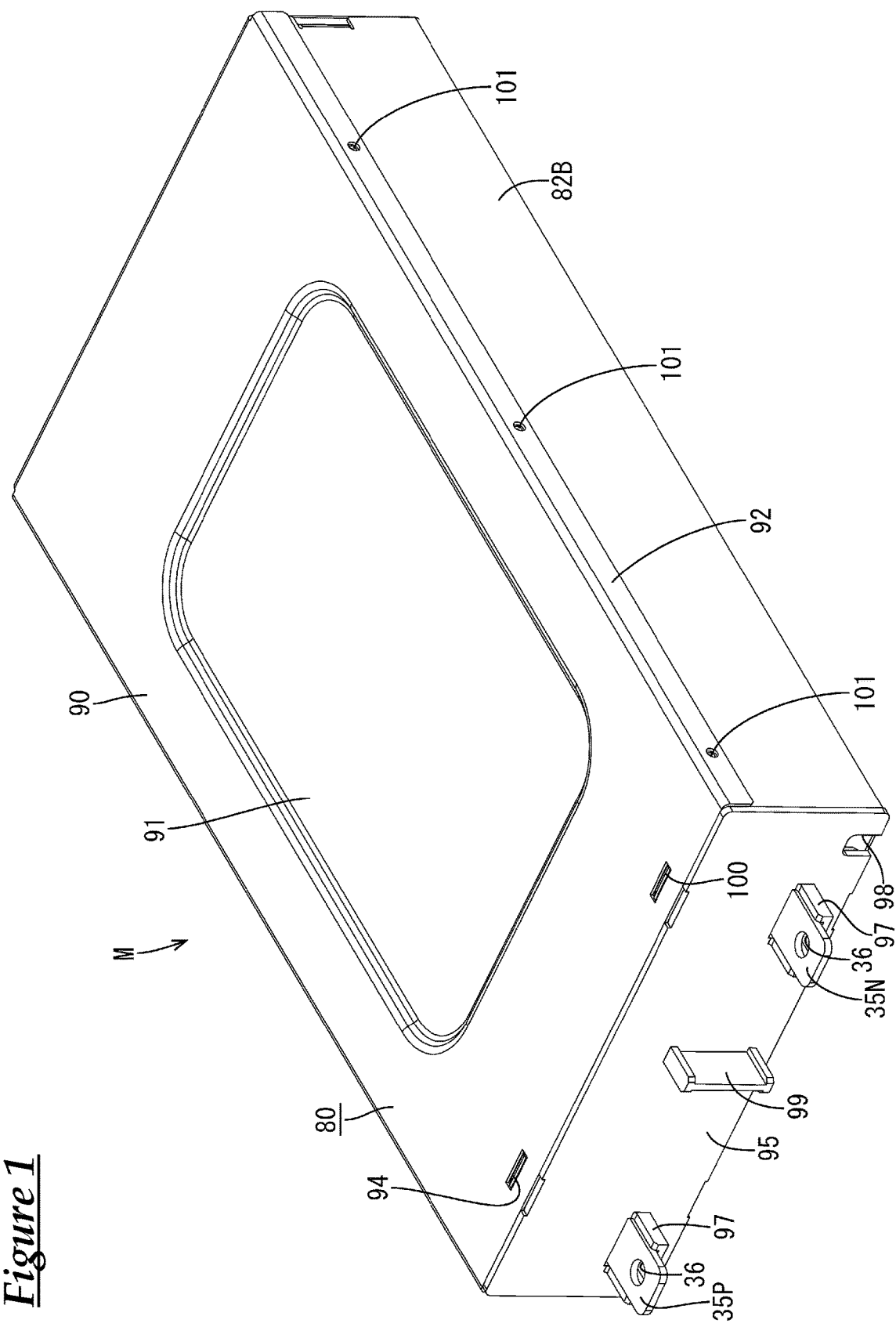
FIG. 1 is a perspective view of a battery module according to an embodiment.
Figure 2:
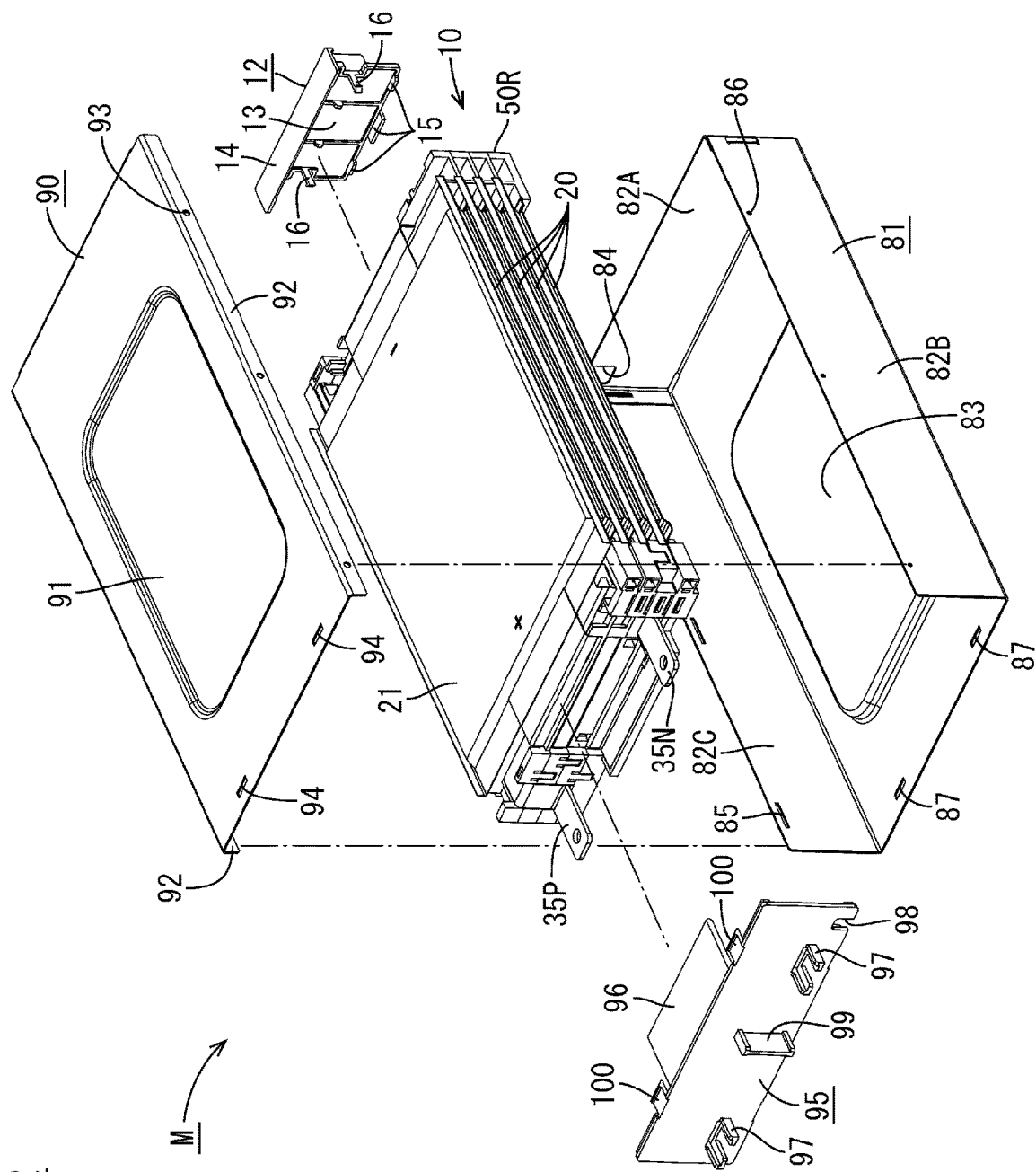
FIG. 2 is an exploded perspective view of the battery module.

As shown in FIG. 1, the battery module M as a whole has the shape of a somewhat flat rectangular solid, and has a structure in which a stack 10 formed by stacking four battery units 20 shown in the drawing is accommodated in a case 80, as shown in FIG. 2.

As will be described in detail later, the case 80 includes a case body 81 that is opened to the top and to the left side (the left front side in FIG. 2), a top lid 90 configured to be attached to the top surface, and a side lid 95 configured to be mounted to the left side. The case body 81 and the top lid 90 are made of metal, and the side lid 95 is made of synthetic resin.

Figure 3:
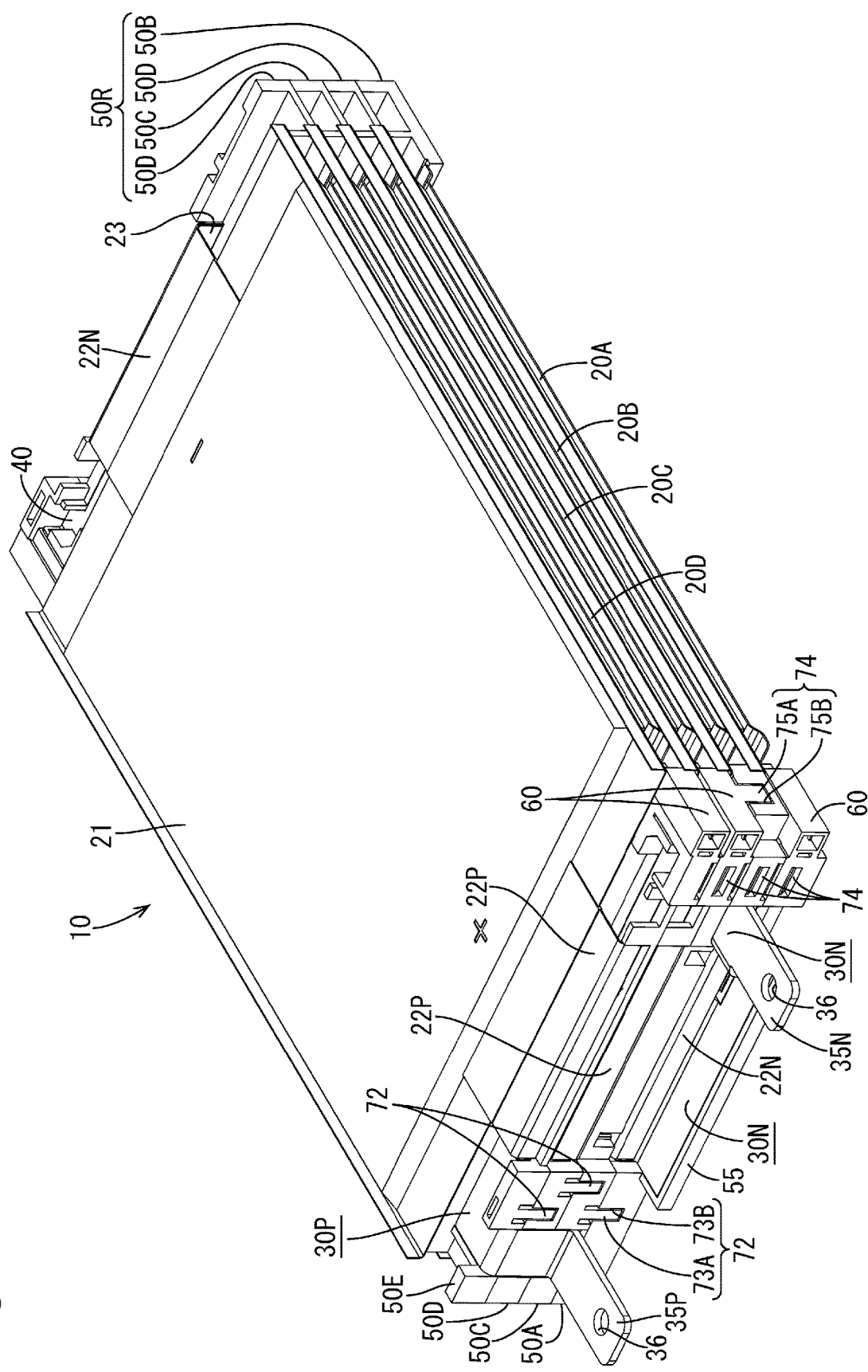
FIG. 3 is a perspective view of a stack.
Figure 4:
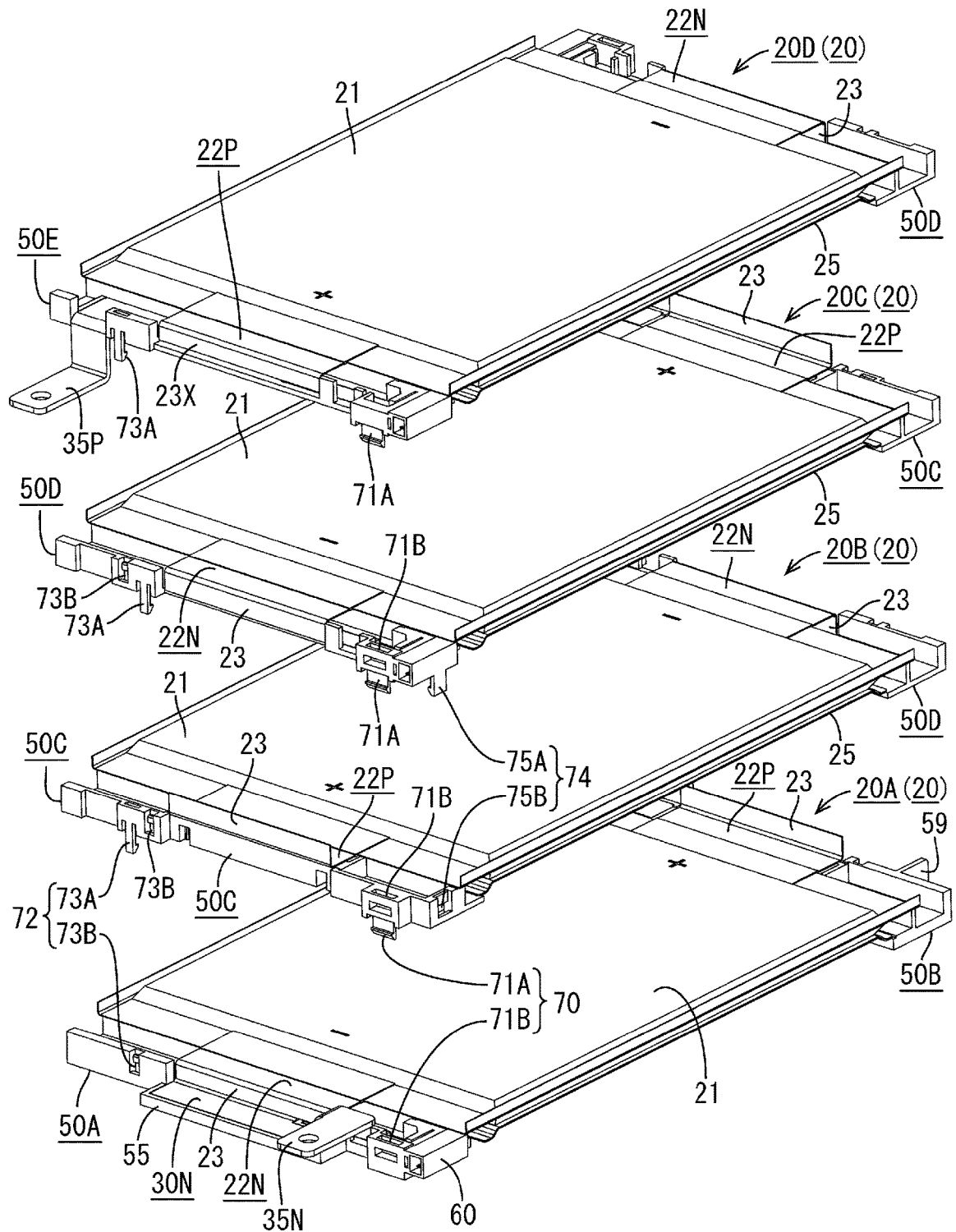
FIG. 4 is an exploded perspective view of the battery module.
Figure 5:
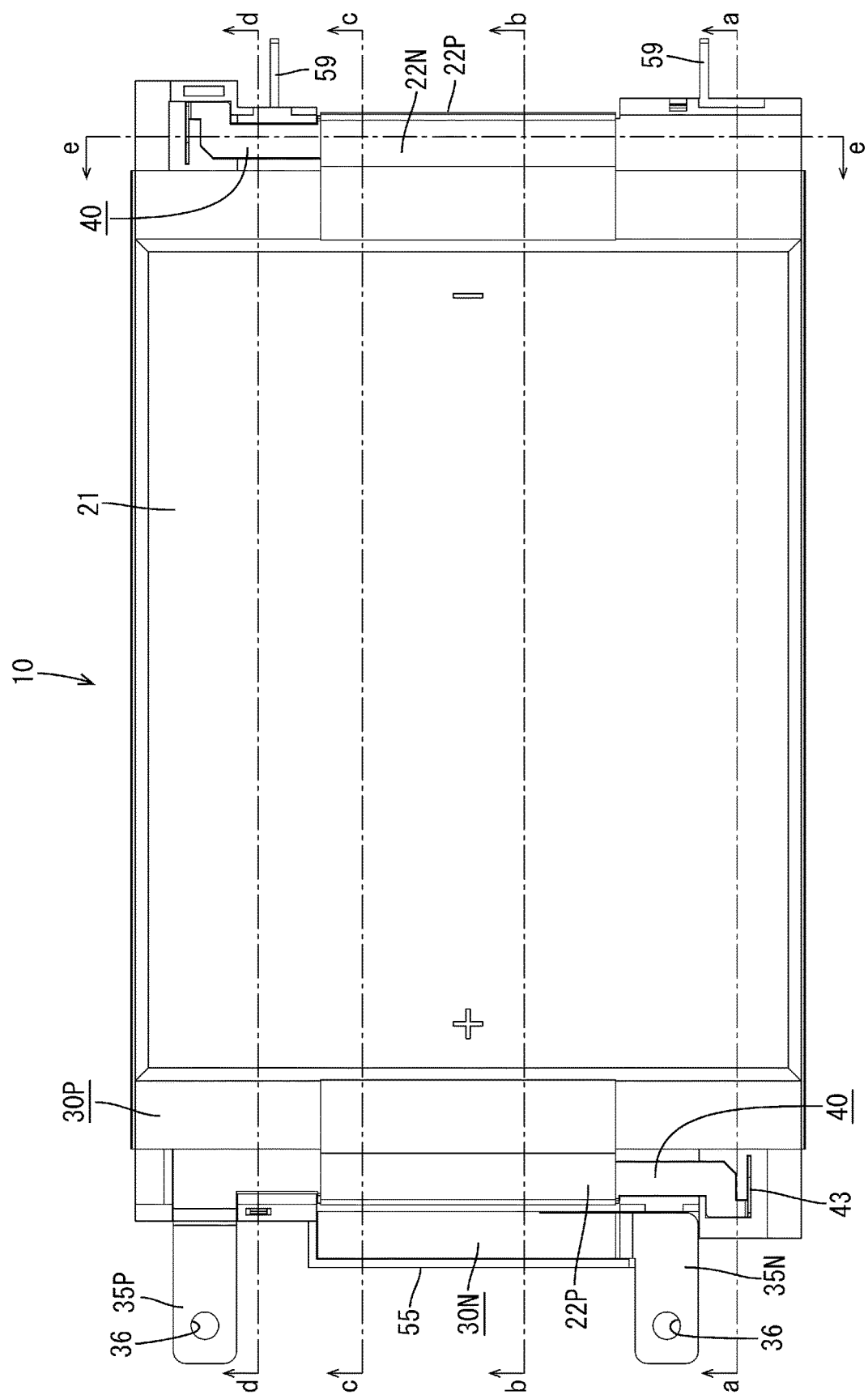
FIG. 5 is a plan view of the battery module.
Figure 6:
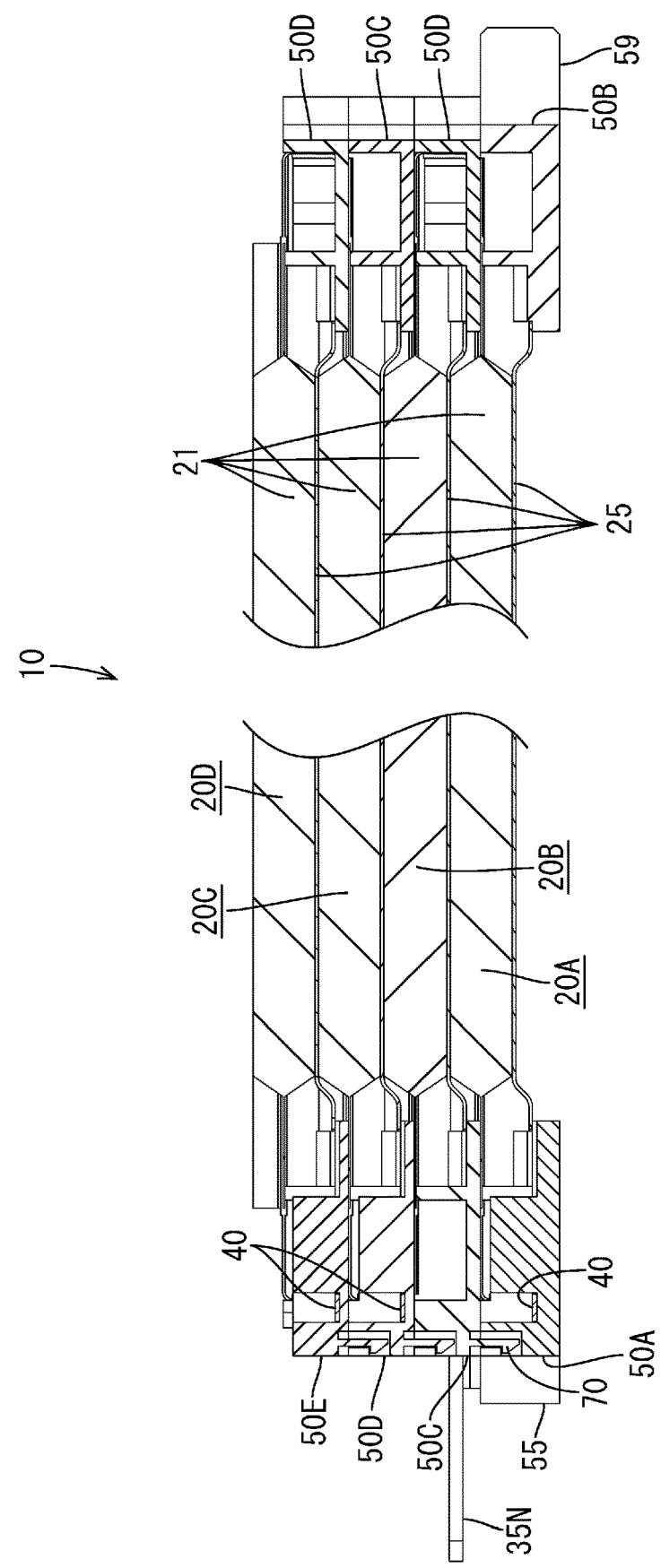
FIG. 6 is a partially cutout enlarged cross-sectional view taken along the line a-a in FIG. 5.

The stack 10 will now be described. As shown in FIGS. 3 and 4, the stack 10 is formed by stacking four battery units 20 in four tiers.

Figure 12:
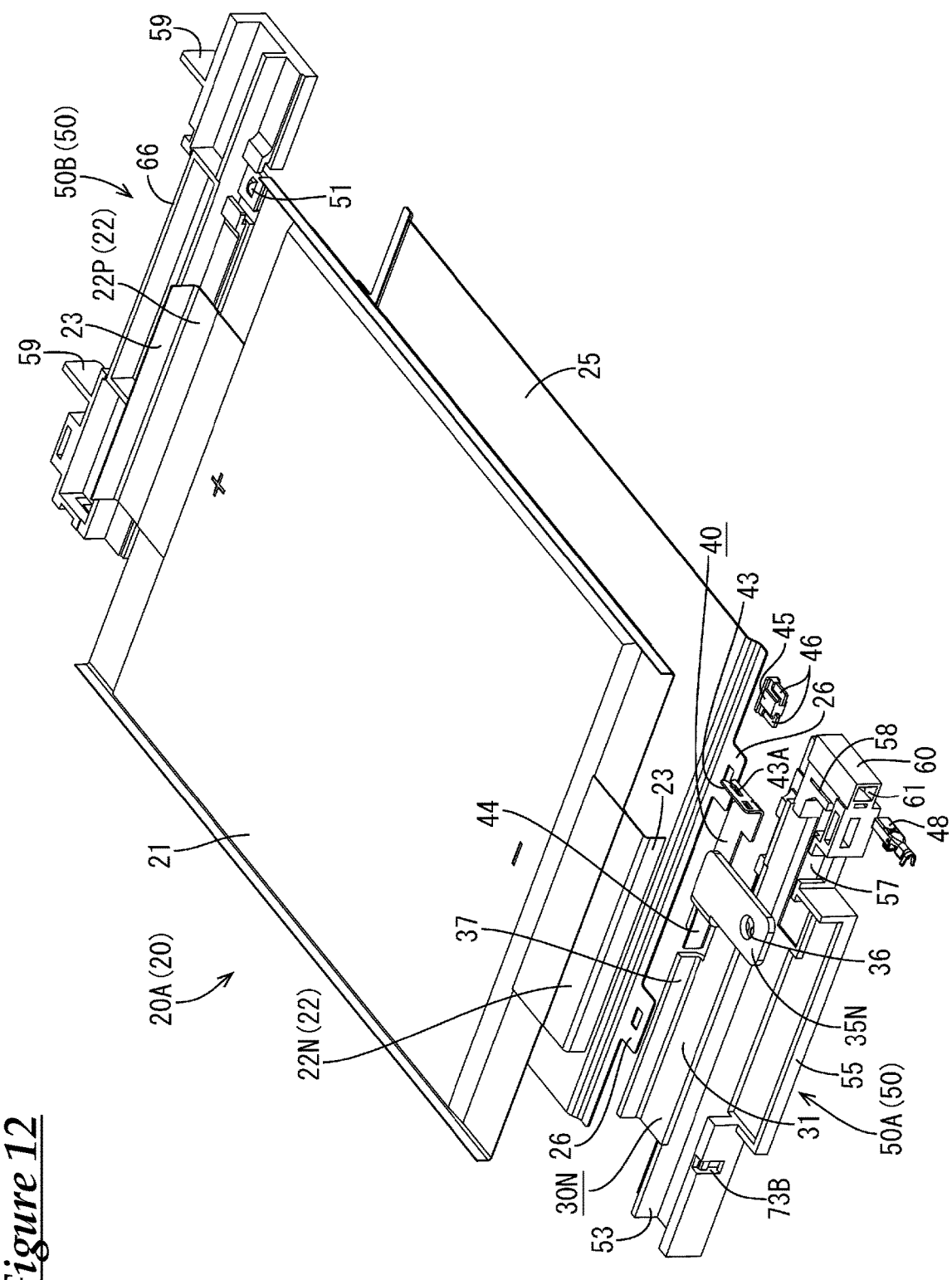
FIG. 12 is an exploded perspective view of the battery unit in the first tier.
Figure 13:
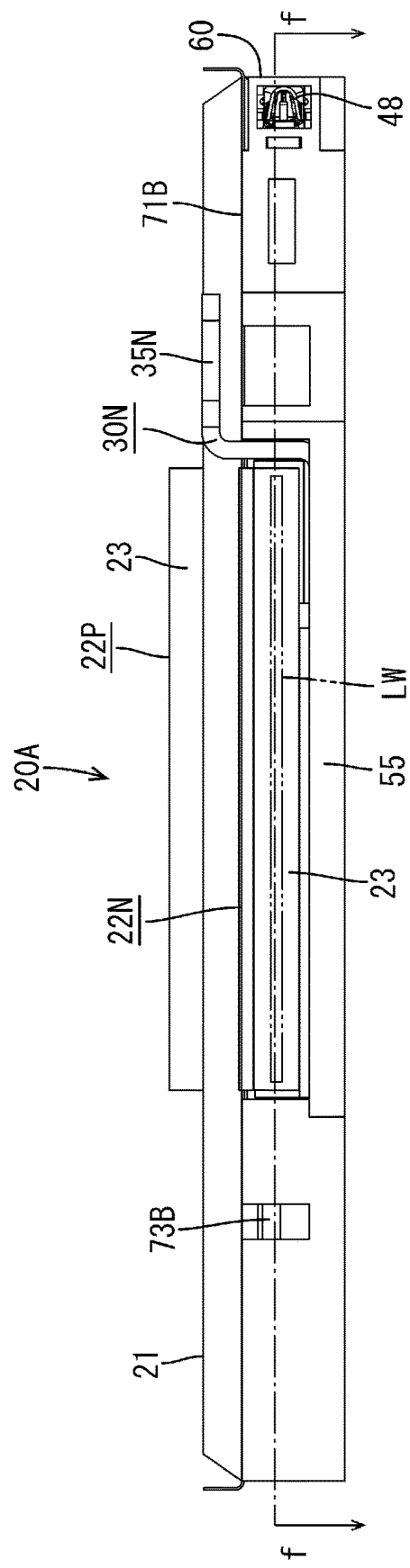
FIG. 13 is a left side view of the battery unit in the first tier.
Figure 15:
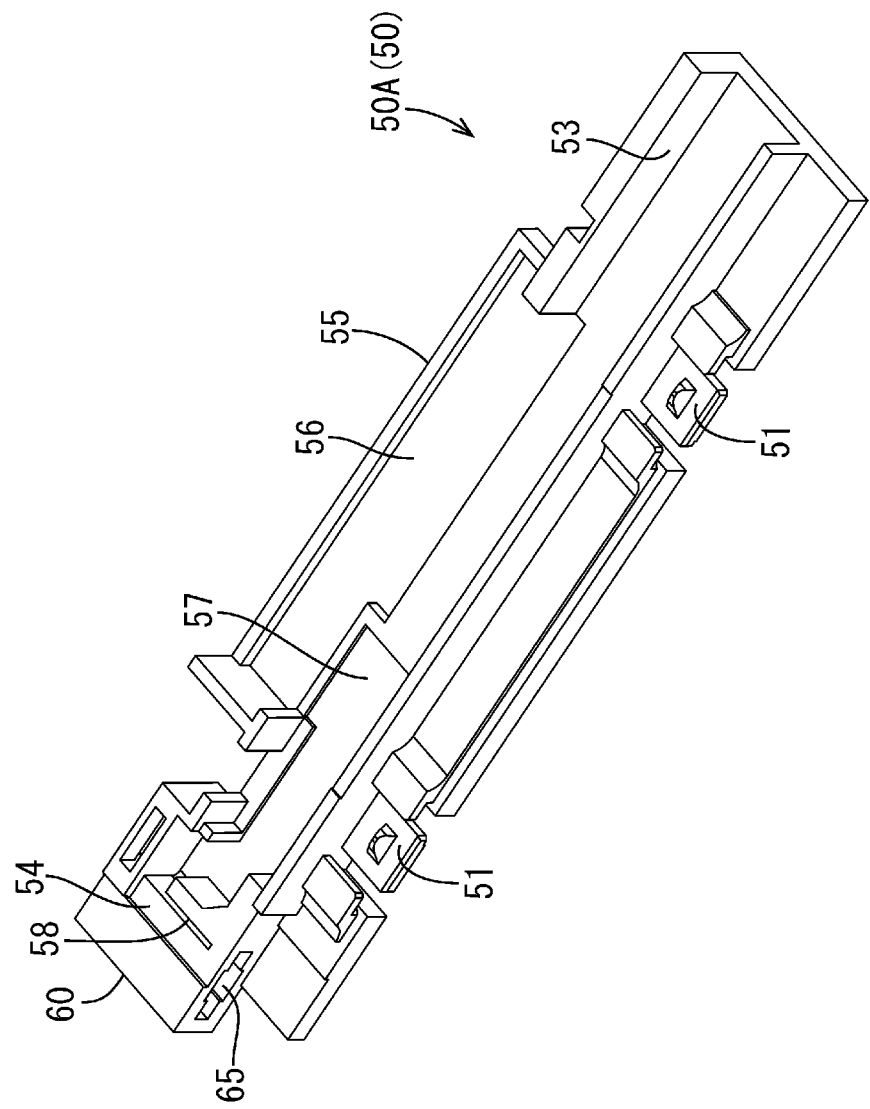
FIG. 15 is a rear perspective view of a first separator.
Figure 16:
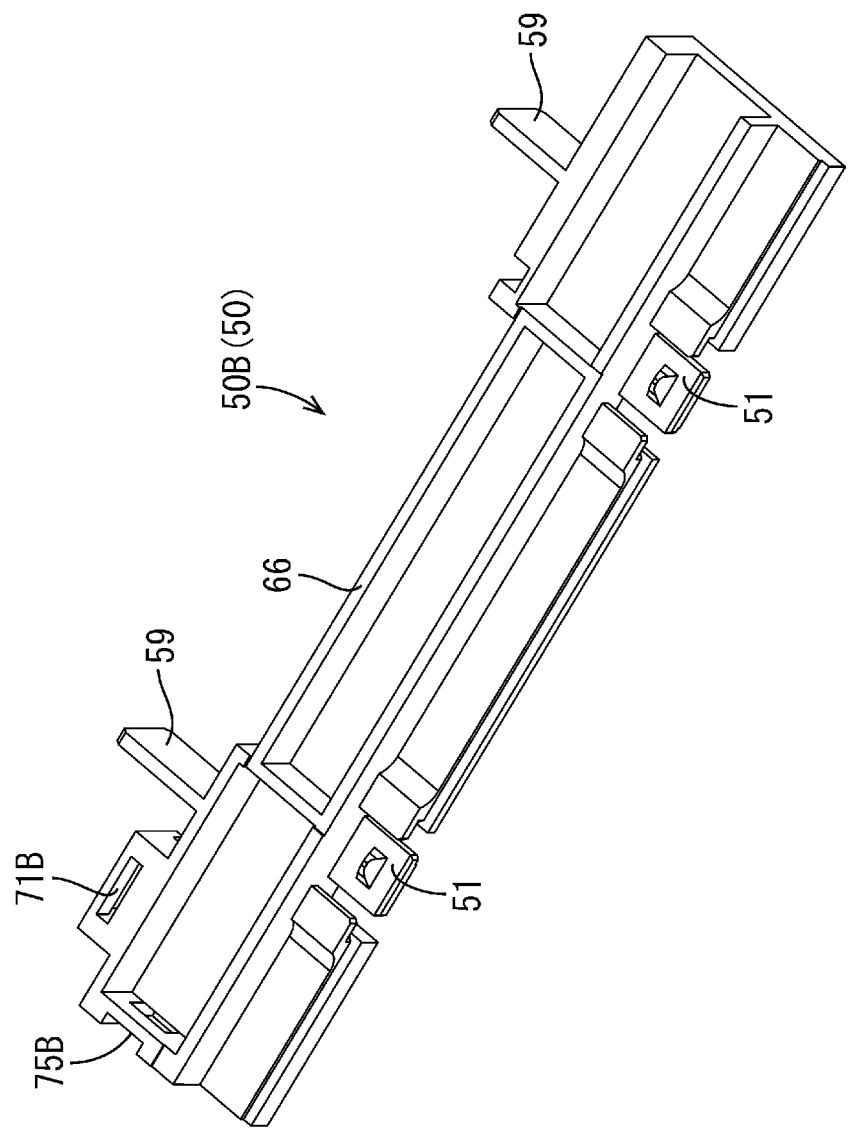
FIG. 16 is a perspective view of a second separator.

As illustrated in FIG. 12, each of the battery units 20 has a structure in which an electric cell 21 having a horizontally elongated rectangular shape in plan view is placed on a heat transfer plate 25 with separators 50 made of synthetic resin provided on the left and right side edges. The separators 50 on the left and right sides are each formed in the shape of a somewhat flat angular bar having a length comparable to the length of the left and right end edges (shorter-side end edges) of the heat transfer plate 25, and are each configured to be attached by inserting and locking, to a pair of insertion-type lock portions 51 provided on the inner surface thereof (the surface opposing the left and right end edges of the heat transfer plate 25), locking members 26 (FIG. 14) opposingly protruding at the left and right end edges of the heat transfer plate 25, as shown in FIGS. 15 and 16.

As shown in FIG. 12, each electric cell 21 is a laminated cell, which has the shape of a plane rectangle that is long in the left-right direction as described above by enveloping a power generating element (not shown) with a laminate film, and one end side thereof in the length direction serves as a positive electrode, and the other end side thereof serves as a negative electrode. As shown in FIG. 4, the four electric cells 21 have opposite orientations with respect to the horizontal direction, and are stacked with the end edges of the positive electrodes and the end edges of the negative electrodes in alternation.

From a width center position of the left and right end edges (end edges of the positive electrode and the negative electrode) of each of the electric cells 21, a lead terminal 22 having a thin strip shape protrudes outward.

As for the lead terminals 22, basically, the lead terminal 22 (positive lead terminal 22P) protruding from an end edge of the positive electrodes has an L-shape whose distal end portion is upwardly bent at a right angle, and the lead terminal 22 (negative lead terminal 22N) protruding from an end edge of each of the negative electrodes has an L-shape whose distal end portion is downwardly bent at a right angle.

However, in the electric cell 21 applied to a battery unit 20D in the fourth tier (uppermost tier), the positive lead terminal 22P has a downward L-shape.

Although the details will be described later, when the electric cells 21 have been stacked, the lead terminals 22 are connected to each other on the right end edge side (the right back side in FIG. 4) for the electric cell 21 in the first tier (lowermost tier) and the electric cell 21 in the second tier, the lead terminals 22 are connected to each other on the left end edge side for the electric cell 21 in the subsequent second tier and the electric cell 21 in the third tier, and finally, the lead terminals 22 are connected to each other on the right end edge side again for the electric cell 21 in the third tier and the electric cell 21 in the fourth tier (uppermost tier).

The negative lead terminal 22N of the electric cell 21 in the first tier and the positive lead terminal 22P of the electric cell 21 in the fourth tier are configured such that a pair of bus bars 30 (a negative bus bar 30N and a positive bus bar 30P) are respectively connected thereto.

In addition, means for detecting the voltages of the electric cells 21 are provided. Accordingly, five voltage detection lines (not shown) are provided, and voltage detection terminals 40 connected to the terminal ends of the respective voltage detection lines are connected in a total of five locations, namely, the negative lead terminal 22N of the electric cell 21 in the first tier, the lead terminal 22 connected between the electric cells 21 in the first and second tiers, the lead terminal 22 connected between the electric cells 21 in the second and third tiers, the lead terminal 22 connected between the electric cells 21 in the third and fourth tiers, and the positive lead terminal 22P of the electric cell 21 in the fourth tier.

With the structure of the stack 10 described above, the battery unit 20 in each of the tiers basically has a structure in which the electric cell 21 is placed on the heat transfer plate 25 with the insulating separators 50 provided at the left and right side edges. However, the type of the conductors (the lead terminal 22, the bus bar 30, and the voltage detection terminal 40) mounted to the separators 50 differ for the battery unit 20 in each tier, and the shapes of the separators 50 differ accordingly. In the following, the structure of the battery unit 20 will be described for each tier, focusing on the difference in shape between the separators 50. Note that members and portions having identical functions are denoted by identical reference numerals, and redundant descriptions thereof have been omitted or simplified.

The battery unit 20A in the first tier (lowermost tier) will be described with reference to FIGS. 11 to 16. The battery unit 20A in the first tier is configured such that the negative lead terminal 22N of the electric cell 21, the negative bus bar 30N, and the voltage detection terminal 40 are mounted to a first separator 50A attached at the left side edge of the heat transfer plate 25, whereas only the positive lead terminal 22P is mounted to a second separator 50B on the right side.

As previously described, the negative lead terminal 22N mounted to the first separator 50A on the left side has an L-shape whose distal end portion is downwardly bent, and the downward portion serves as a welding portion 23.

Figure 14:
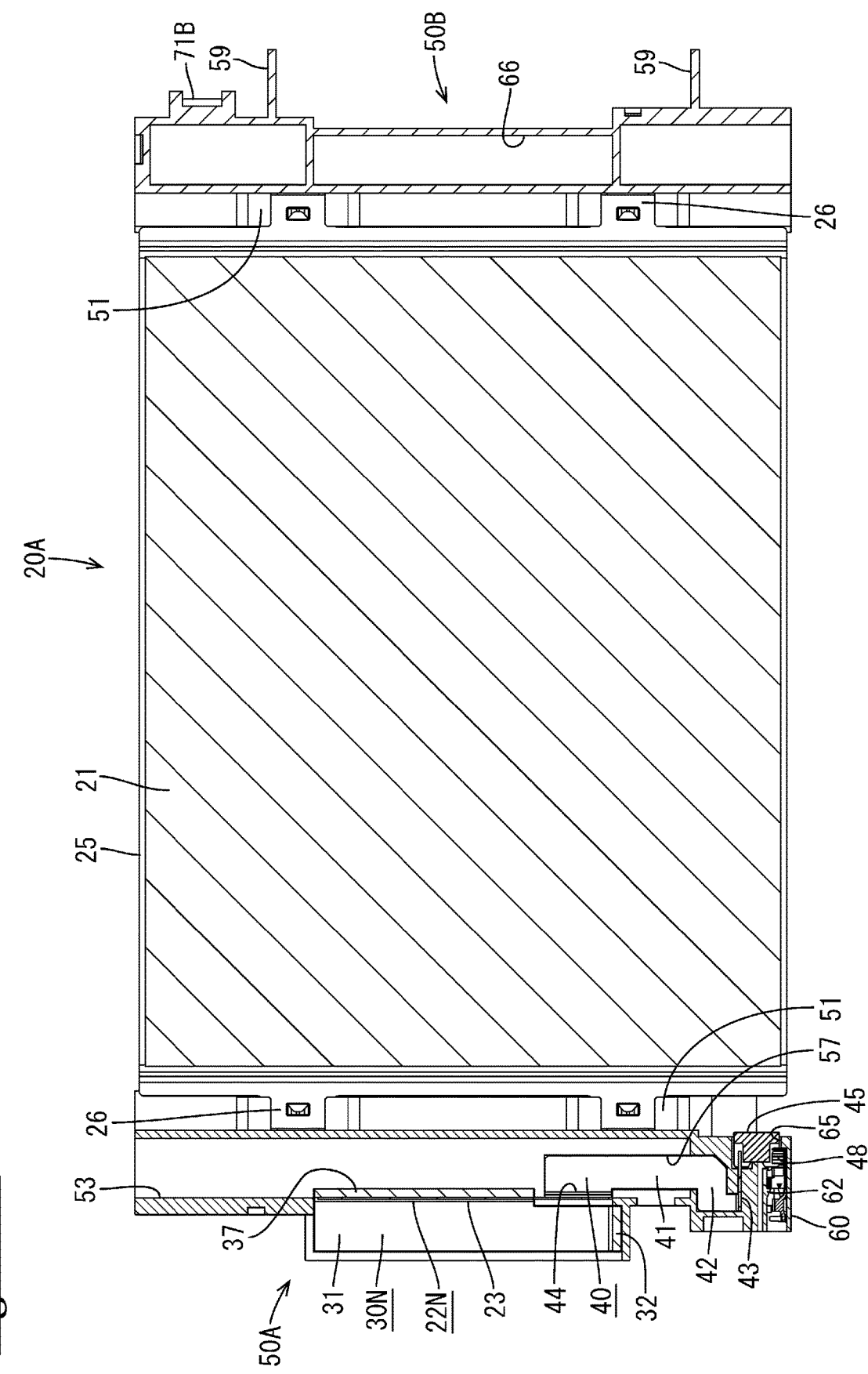
FIG. 14 is a cross-sectional view taken along the line f-f in FIG. 13.

As shown in FIG. 14, the negative bus bar 30N includes an elongated substrate 31 having an standing portion 32, at a front end (the lower end in the drawing). As shown in FIG. 12, a negative plate 35N protrudes leftward from the upper edge of the upright portion 32, and a connection hole 36 is opened at the protruding end thereof. A welding portion 37 is formed upright over a wide region on the rear end side at the right side edge of the substrate 31.

As shown in FIGS. 12 and 14, the voltage detection terminal 40 includes an elongated substrate 41 having a widened portion 42 on the front end side. A connection plate 43 is formed upright from a left end portion of the front edge of the widened portion 42, and a welding portion 44 is formed upright from a rear end portion of the left side edge of the substrate 41.

As also shown in FIG. 15, on the top of the first separator 50A, a recessed groove 53 is formed so as to open at the rear end at a position located slightly to the back from the front end (the back side in the drawing), and a platform 55 on which the negative bus bar 30N is placed bulges out at the central portion at the left side edge of the recessed groove 53. A recessed portion 56 to which the substrate 31 (including the upright portion 32) of the negative bus bar 30N is tightly fitted is formed in the platform 55, and the bottom of the recessed portion 56 is continuous with the bottom of the recessed groove 53 but located slightly therebelow.

Figure 11:
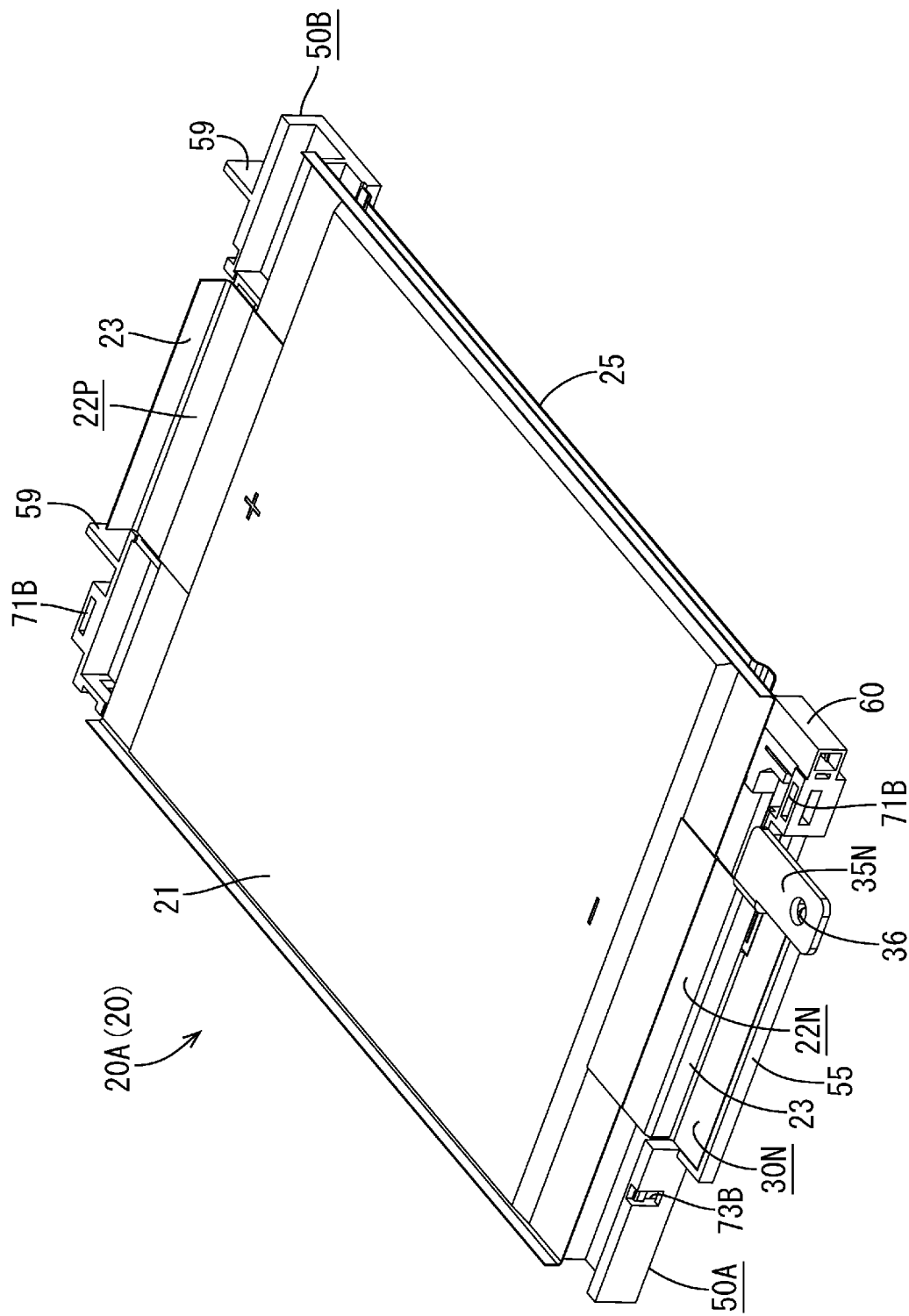
FIG. 11 is a perspective view of a battery unit in a first tier.

When the substrate 31 of the negative bus bar 30N is fitted in the recessed portion 56 of the platform 55, the negative plate 35N protrudes leftward from a position on the front side at the upper end of the front wall of the platform 55, as shown in FIG. 11. As shown in FIG. 14, the welding portion 37 stands upright from a position located along the left side edge of the recessed groove 53.

As shown in FIG. 15, a placement recessed portion 57 on which the substrate 41 of the voltage detection terminal 40 is placed so as to be tightly fitted is formed in an area extending from a front end portion of the recessed groove 53 to a part of a front wall portion 54. A slit 58 into which the connection plate 43 can be inserted from above is formed in the front wall portion 54.

When the substrate 41 of the voltage detection terminal 40 is fitted in the placement recessed portion 57 while the connection plate 43 is inserted into the slit 58 from above, the welding portion 44 stands upright in alignment on the front side of the welding portion 37 of the negative bus bar 30N, as shown in FIG. 14.

Here, the outer surface of the welding portion 44 of the voltage detection terminal 40 and the inner surface of the welding portion 37 of the negative bus bar 30N are located on the same plane in the front-rear direction, so that the inner surface of the welding portion 23 of the negative lead terminal 22N can overlap both of these surfaces.

The above-described voltage detection terminal 40 is connected to the terminal end of the voltage detection line via a fuse 45. Accordingly, as shown in FIGS. 12 and 14, a connector portion 60 having a cavity 61 into which a female terminal 48 can be inserted from the outside is formed at the front end portion of the first separator 50A. In addition, a fuse accommodating hole 65 into which the fuse 45 can be inserted from the inside is formed in the inner surface extending from the connector portion 60 to the front wall portion 54. The back end of the fuse accommodating hole 65 is in communication with the back end of the cavity 61 and a lower position of the slit 58.

When the female terminal 48 connected to the terminal end of the voltage detection line is inserted in the cavity 61 of the connector portion 60, the female terminal 48 is locked by being retained by a lance 62. Subsequently, when the fuse 45 is inserted into the fuse accommodating hole 65, one lead plate 46 is press-fitted into a press-fitting groove 48A (see FIG. 10) formed on the female terminal 48, and another lead plate 46 is press-fitted and attached to a press-fitting groove 43A formed on the connection plate 43 of the voltage detection terminal 40. Consequently, the terminal end of the voltage detection line is connected to the voltage detection terminal 40 via the fuse 45.

On the other hand, the second separator 50B on the right side serves to mount only the positive lead terminal 22P for the mounting of the conductors, and includes a receiving portion 66 having the shape of an angular frame formed at the central portion in the length direction, as shown in FIG. 16. As previously described, the positive lead terminal 22P has an L-shape whose distal end portion is bent upwardly, and the upward portion serves as the welding portion 23.

The positive lead terminal 22P is received across the receiving portion 66 provided on the second separator 50B. At this time, the welding portion 23 is disposed upright from a position protruding slightly outward from the right side wall of the receiving portion 66 (see FIG. 8).

Note that at front and rear end portions on the right side of the second separator 50B, a pair of contact plates 59 are formed so as to protrude by the same length.

A battery unit 20B in the second tier will be described with reference to FIGS. 17 to 20. The battery unit 20B in the second tier is configured such that only the positive lead terminal 22P of the electric cell 21 is mounted to the third separator 50C on the left side, and the negative lead terminal 22N and the voltage detection terminal 40 are mounted to the fourth separator 50D on the right side.

Accordingly, the receiving portion 66 having the shape of an angular frame is formed at the central portion of the third separator 50C in the length direction. The positive lead terminal 22P of the electric cell 21 in the second tier is also received across the receiving portion 66, and the welding portion 23 is disposed upright from a position protruding slightly outward from the left side wall of the receiving portion 66.

On the other hand, a receiving portion 67 that receives the negative lead terminal 22N is set at the central portion, in the length direction, of the fourth separator 50D on the right side. The receiving portion 67 has a structure formed by cutting away the right side wall of the recessed groove 53. On the rear end side of the fourth separator 50D, the placement recessed portion 57 of the voltage detection terminal 40 (oriented to be reversed in the front-rear direction with respect to the voltage detection terminal 40 in the first tier) is formed together with the connector portion 60 and the fuse accommodating hole 65.

Figure 20:
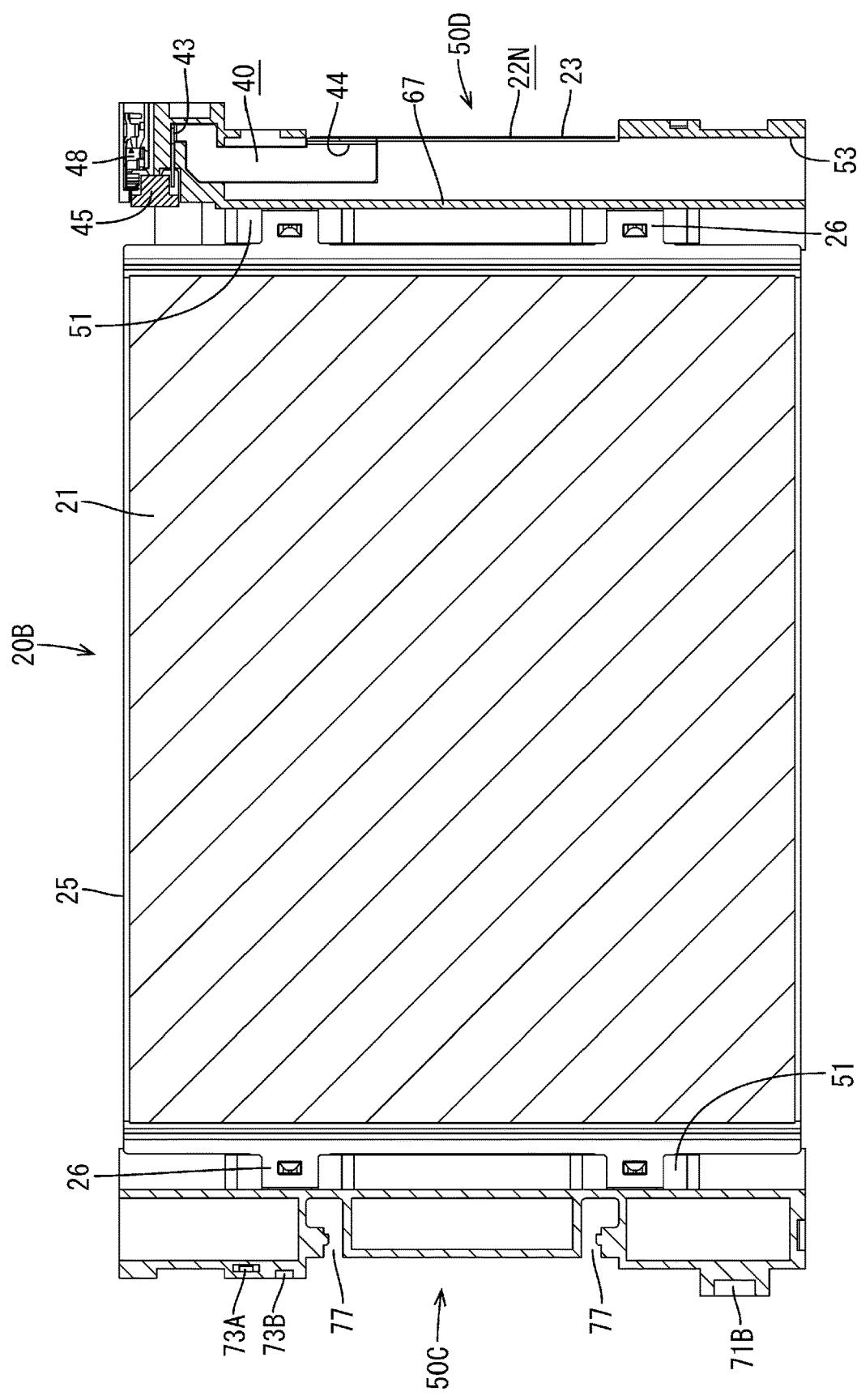
FIG. 20 is a cross-sectional view taken along the line g-g in FIG. 19.

When the voltage detection terminal 40 is placed in the placement recessed portion 57, the welding portion 44 stands upright from a position located along the right side edge of the recessed groove 53, as shown in FIG. 20. When the negative lead terminal 22N of the electric cell 21 in the second tier is received by the receiving portion 67, the welding portion 23 hangs down at a position located along the right side edge of the recessed groove 53, so that the rear end portion of the welding portion 23 overlaps the outer surface of the welding portion 44 of the voltage detection terminal 40.

The voltage detection terminal 40 is connected to the terminal end of the voltage detection line via the fuse 45 in the same manner as described above.

A battery unit 20C in the third tier has a form in which the above-described battery unit 20B in the second tier has an opposite orientation with respect to the horizontal direction (i.e. is laterally reversed), and is configured such that the fourth separator 50D is disposed on the left side of the heat transfer plate 25, the negative lead terminal 22N of the electric cell 21 in the third tier and the voltage detection terminal 40 are mounted to the fourth separator 50D, whereas the third separator 50C is disposed on the right side of the heat transfer plate 25, and only the positive lead terminal 22P is mounted to the third separator 50C, as schematically shown in FIG. 4.

Finally, the battery unit 20 in the fourth tier (uppermost tier) will be described with reference to FIGS. 21 to 25. The battery unit 20 in the fourth tier is configured such that the positive lead terminal 22P of the electric cell 21, the positive bus bar 30P, and the voltage detection terminal 40 in the fourth tier are mounted to the fifth separator 50E attached to the left side edge of the heat transfer plate 25, whereas the above-described fourth separator 50D is disposed on the right side, and the negative lead terminal 22N of the electric cell 21 in the fourth tier is mounted.

As previously described, the positive lead terminal 22P of the electric cell 21 in the fourth tier has a downward L-shape, or in other words, formed such that a welding portion 23X hangs down.

Figure 22:
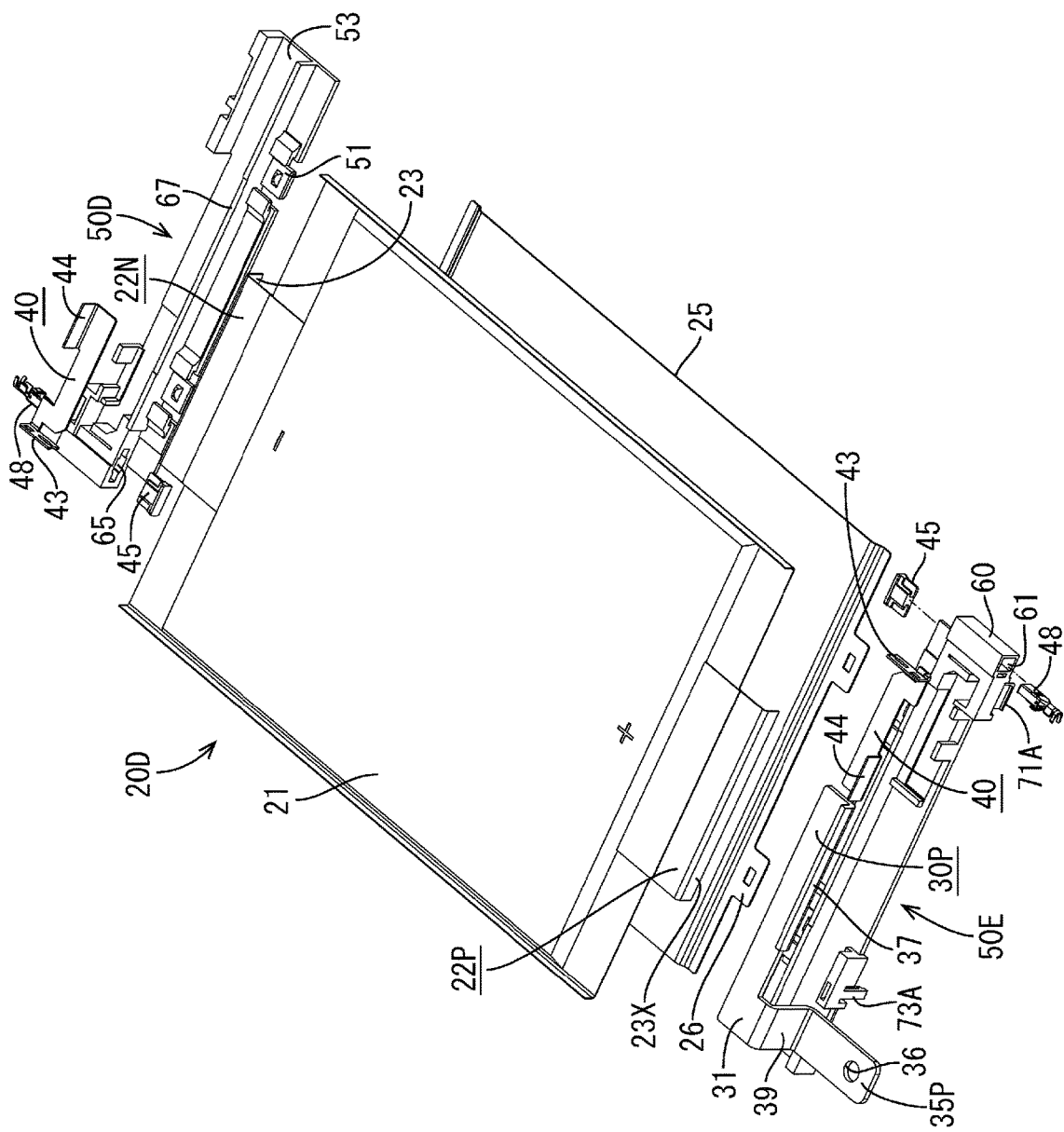
FIG. 22 is an exploded perspective view of the battery unit in the fourth tier.
Figure 23:
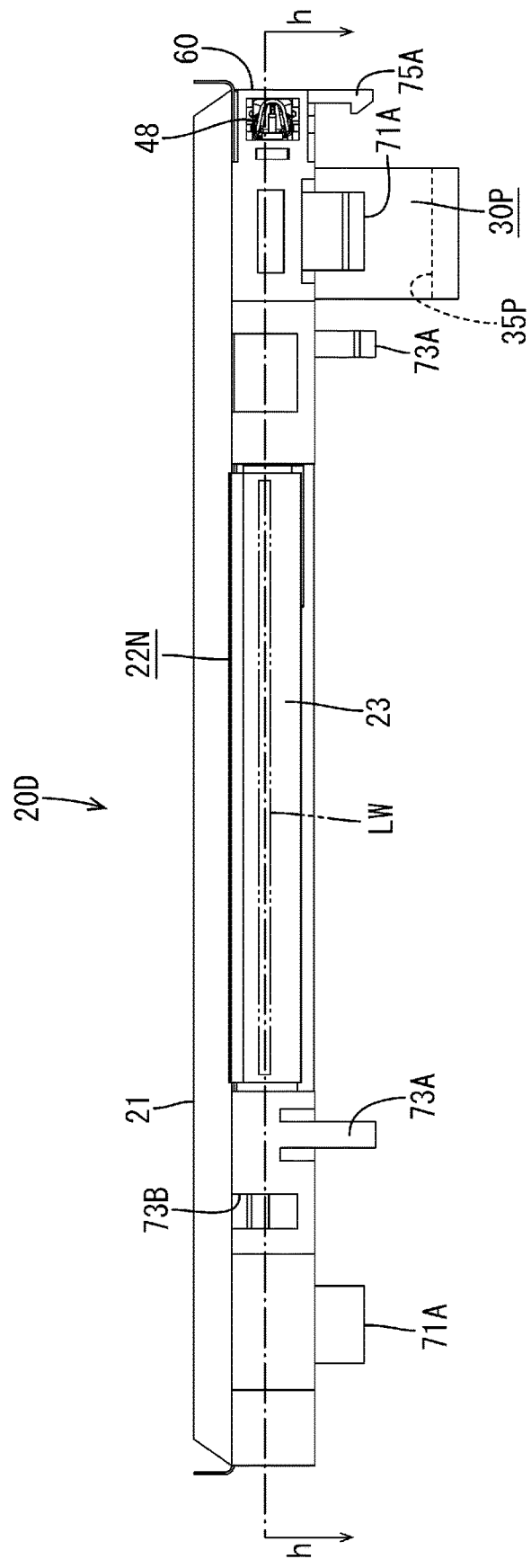
FIG. 23 is a right side view of the battery unit in the fourth tier.
Figure 24:
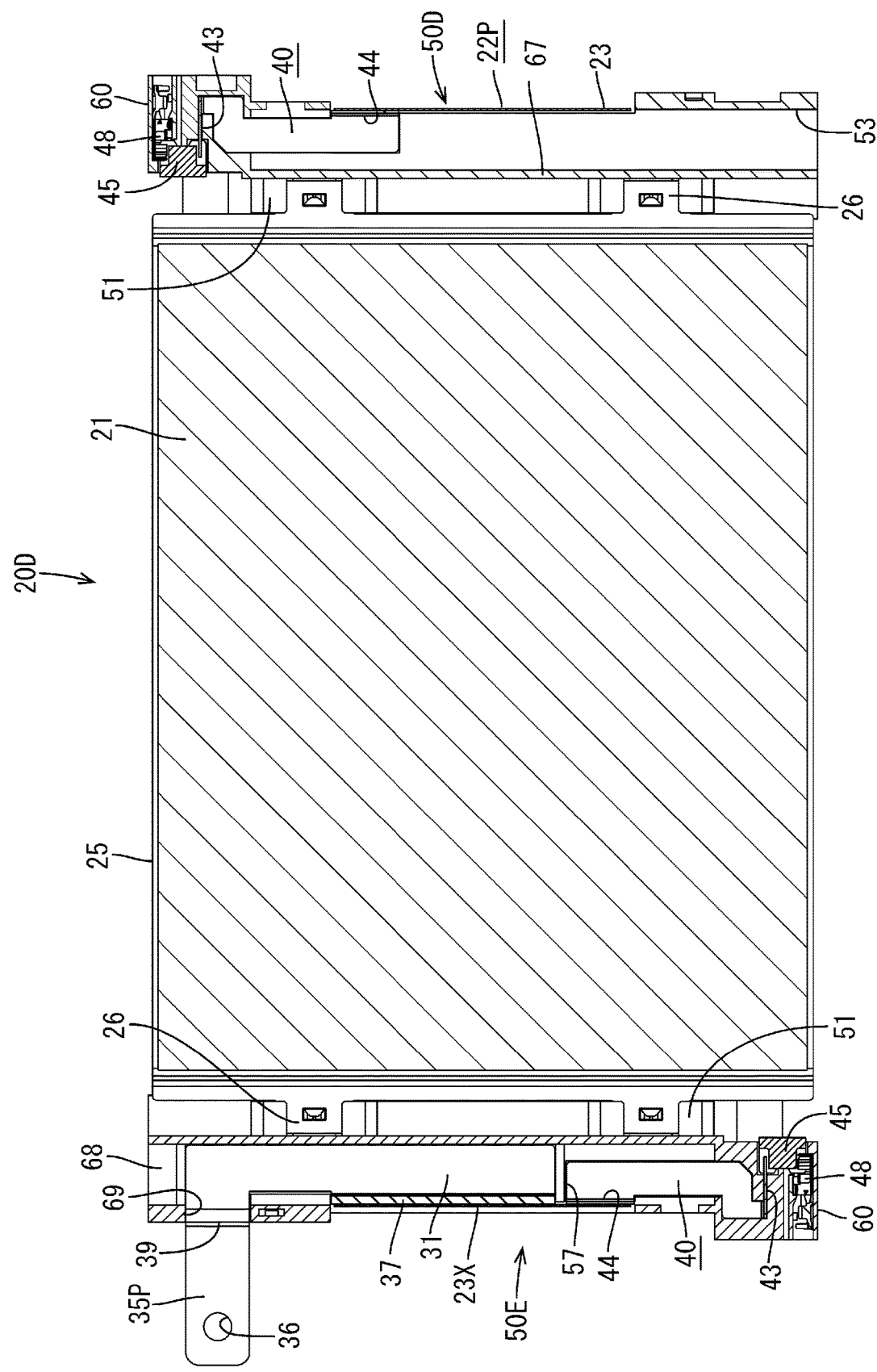
FIG. 24 is a cross-sectional view taken along the line h-h in FIG. 23.

As shown in FIGS. 22 and 24, the positive bus bar 30P includes, at the left side edge at the rear end (the upper end in FIG. 24), an elongated substrate 31 including a hanging portion 39 that is bent. A positive plate 35P is formed protruding leftward from the lower edge of the hanging portion 39, and a connection hole 36 is opened at the protruding end. In addition, a welding portion 37 is formed upright over a wide region on the front end side at the left side edge of the substrate 31.

The voltage detection terminal 40 is disposed in the same orientation as the voltage detection terminal 40 mounted to the first separator 50A in the first tier.

Figure 25:
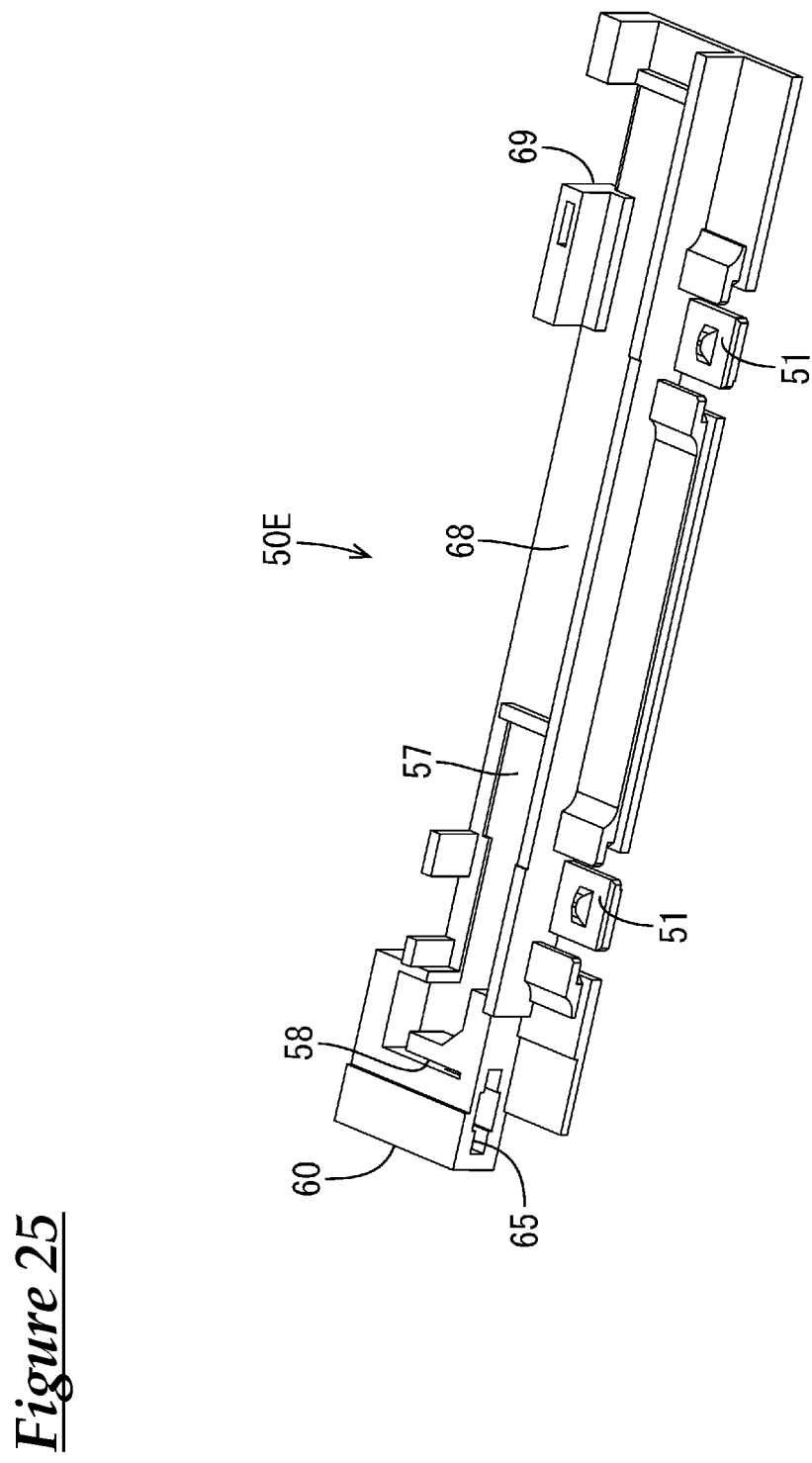
FIG. 25 is a rear perspective view of a fifth separator.

As shown in FIGS. 24 and 25, a platform 68 on which the substrate 31 of the positive bus bar 30P is placed so as to be tightly fitted is formed on the rear side (the right side in FIG. 25) on the top of the fifth separator 50E. As shown in FIG. 24, at the left side edge of the platform 68, the side wall is opened by being cut away in a little more than half of the region on the front side, and a cut-out portion 69 that allows the upper end of the hanging portion 39 of the substrate 31 of the positive bus bar 30P to be fitted and escape is formed at a position located toward the rear end of the left side edge.

Figure 21:
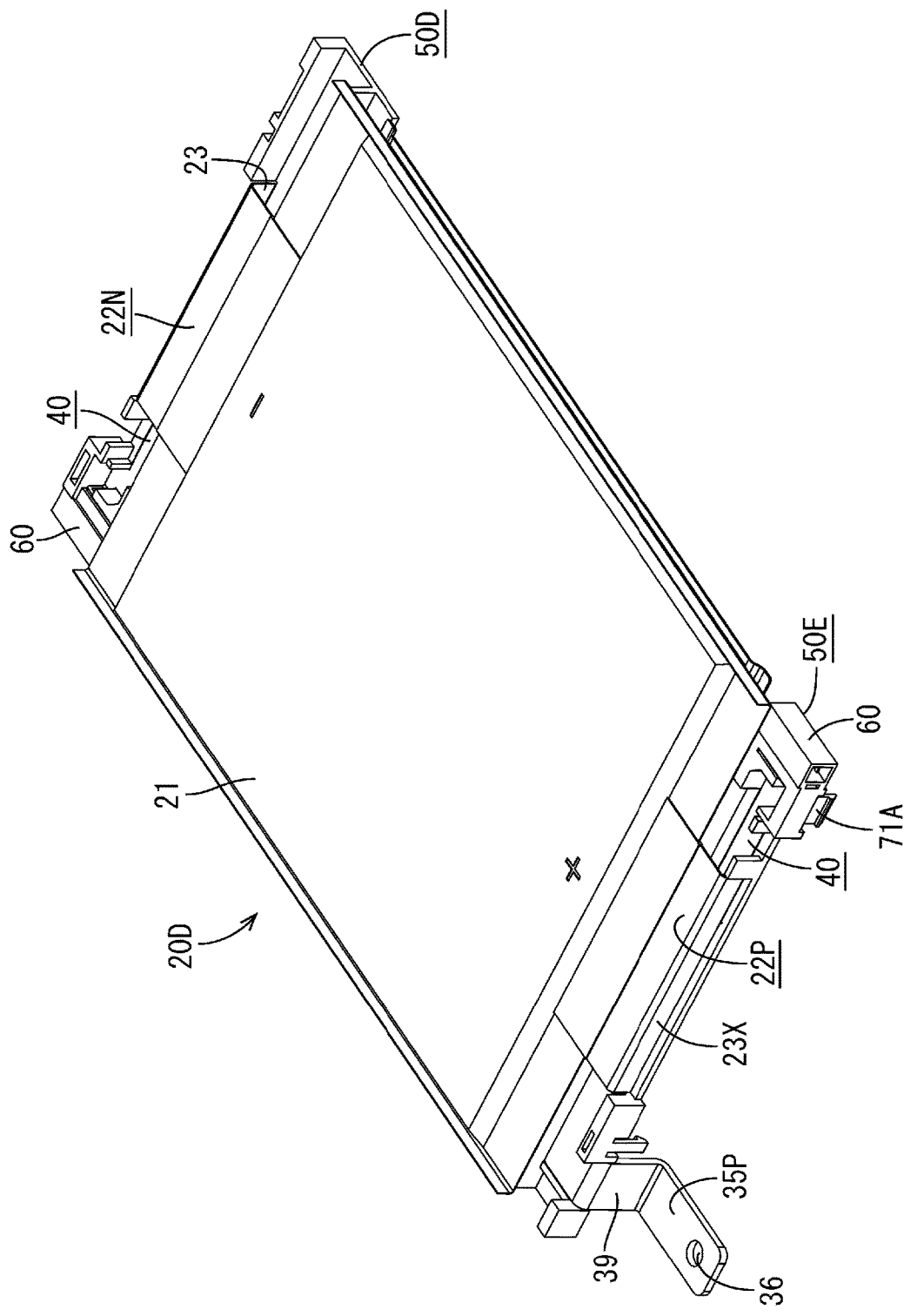
FIG. 21 is a perspective view of a battery unit in a fourth tier.

When the substrate 31 of the positive bus bar 30P is fitted on the platform 68, the positive plate 35P provided at the lower end of the hanging portion 39 protrudes leftward from a position that is lower than the bottom of the fifth separator 50E by a predetermined dimension, as shown in FIG. 21.

On the front end side of the fifth separator 50E, the placement recessed portion 57 of the voltage detection terminal 40 is formed together with the connector portion 60 and the fuse accommodating hole 65.

When the substrate 41 of the voltage detection terminal 40 is fitted in the placement recessed portion 57 while the connection plate 43 is inserted into the slit 58, the welding portion 44 stands upright in alignment on the front side of the welding portion 37 of the positive bus bar 30P, as shown in FIG. 24.

Here, the outer surface of the welding portion 44 of the voltage detection terminal 40 and the outer surface of the welding portion 37 of the positive bus bar 30P are located on the same plane in the front-rear direction, so that the inner surface of the welding portion 23X of the positive lead terminal 22P in the fourth tier can overlap both of these surfaces.

The voltage detection terminal 40 is connected to the terminal end of the voltage detection line via the fuse 45 as described above.

On the other hand, as described with regard to the second tier, the receiving portion 67 that receives the negative lead terminal 22N is set at the central portion, in the length direction, of the fourth separator 50D on the right side, and the placement recessed portion 57 of the voltage detection terminal 40 is formed on the rear end side, together with the connector portion 60 and the fuse accommodating hole 65.

When the voltage detection terminal 40 is placed on the placement recessed portion 57, the welding portion 44 rises from a position located along the right side edge of the recessed groove 53 as shown in FIG. 24.

When the negative lead terminal 22N of the electric cell 21 in the fourth tier is received by the receiving portion 66, the welding portion 23 hangs down at a position located along the right side edge of the recessed groove 53, so that the rear end portion of the welding portion 23 overlaps the outer surface of the welding portion 44 of the voltage detection terminal 40.

The voltage detection terminal 40 is also connected to the terminal end of the voltage detection line via the fuse 45.

Next, a structure for joining the battery units 20 in four tiers to form a stack 10 will be described.

As shown in FIG. 4, the separators 50 on the left side and the separators 50 on the right side in four tiers are configured to be coupled to each other via a total of three types of locking portions 70, 72, and 74, namely, a first locking portion 70 composed of a first locking piece 71A and a first locking hole 71B, a second locking portion 72 composed of a second locking piece 73A and a second locking hole 73B, and a third locking portion 74 composed of a third locking piece 75A and a third locking hole 75B.

The first locking portions 70 is set in three locations on each of the front end side for the separators 50 on the left side, and the rear end side for the separators 50 on the right side. More specifically, the first locking hole 71B is formed in the separator 50 in the first tier, the first locking hole 71B and the first locking piece 71A are formed in the separators 50 in the second tier and the third tier so as to be vertically aligned, and the first locking piece 71A is formed on the separator 50E in the fourth tier.

Likewise, the second locking portion 72 is set in three locations on each of the rear end side for the separator 50 on the left side, and the front end side for the separator 50 on the right side. More specifically, the second locking hole 73B is formed in the separator 50 in the first tier, the second locking piece 73A and the second locking hole 73B are formed in the separators 50 in the second tier and the third tier so as to be vertically aligned, and the second locking piece 73A is formed on the separator 50 in the fourth tier.

Figure 10:
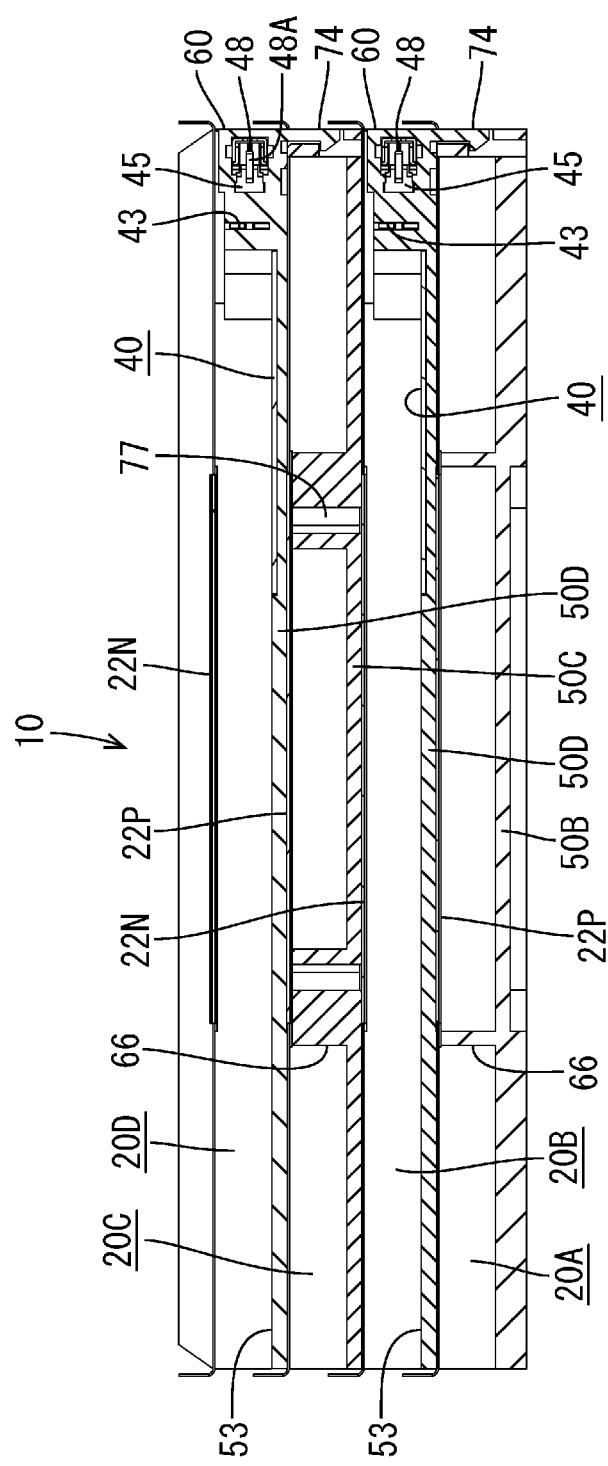
FIG. 10 is an enlarged cross-sectional view taken along the line e-e in FIG. 5.

The third locking portion 74 is set in one location between the front end faces of the separators 50 in the second tier and the third tier on the left side as shown in FIG. 4, and two locations between the rear end faces of the separators 50 in the first tier and the second tier, and between the rear end faces of the separators 50 in the third tier and the fourth tier on the right side as shown in FIG. 10. In each case, the third locking hole 75B is formed in the separator 50 in the lower tier, and the third locking piece 75A is formed on the separator 50 in the upper tier.

Here, as shown in FIG. 2, an insulating member 12 that covers and insulates the lead terminals 22 exposed on the right surface of the stack 10 is provided.

The insulating member 12 is made of synthetic resin, and has a structure in which a top plate 14 is formed protruding so as to cover the central portion on the top of the separator 50 in the fourth tie from the upper edge of the substrate 13 that covers the central portion in the width direction (the placement region of the lead terminals 22) of the separators 50 in the four tiers on the right side (separator group 50R: see FIG. 3) that are coupled so as to overlap one another.

Clamping pieces 15 configured to be put against a right side edge portion on the bottom of the separator 50 in the first tier protrude at the lower edge of the substrate 13.

A pair of attachment pieces 16 protrude from the front and rear side edges of the inner surface (the surface opposing the separator group 50R on the right side) of the substrate 13, and a pair of attachment holes 77 into which the aforementioned attachment pieces 16 are inserted and locked are formed in the right surface of the separator 50C in the third tier so as to oppose each other (see FIG. 20).

When the insulating member 12 is attached to the right surface after the separators 50 in the four tiers on the right side have been normally overlapped and coupled, the insulating member 12 is retained and mounted by engagement between the attachment pieces 16 and the attachment holes 77 in a state in which the separator group 50R on the right side is clamped between the top plate 14 and the clamping pieces 15. Consequently, the lead terminals 22 exposed on the right side surface of the stack 10 are insulated from a right side plate 82A of the case body 81.

The case 80 will now be described. As partly described with reference to FIG. 2, the case 80 includes the case body 81 and the top lid 90, both of which are formed by press working a metal plate, and the side lid 95 made of synthetic resin.

The case body 81 has the shape of a somewhat flat box that is open to the top and to the left side to accommodate the above-described stack 10. A raised portion 83 having a substantially rectangular shape in plan view is formed at the central portion on the bottom of the case body 81. In the right side plate 82A of the case body 81, a lead-out hole 84 from which the voltage detection lines pulled out to the right surface side of the stack 10 are led to the outside is formed at a rear end position of the upper edge of the right side plate 82A.

The top lid 90 is attached to the top opening of the case body 81 described above, and a depressed portion 91 having a substantially rectangular shape in plan view is formed at the central portion of the top lid 90 so as to oppose the raised portion 83 on the bottom surface of the case body 81.

Downward mounting plates 92 are formed at the front and rear edges and the right side edge of the top lid 90, and the top lid 90 covers the top opening of the case body 81 by the mounting plates 92 being attached to upper edge portions of front and rear plates 82B and 82C and the right side plate 82A of the case body 81 described above.

Insertion pieces (not shown) configured to be inserted into insertion grooves 85 formed in an upper edge portion of the rear plate 82C of the case body 81 are formed on the mounting plate 92 on the rear side, and screw insertion holes 93 aligned with screw holes 86 formed in an upper edge portion of the front plate 82B of the case body 81 are formed in the mounting plate 92 on the front side.

The side lid 95 has a rectangular shape to close the left opening of the case body 81. An insulating plate 96 that covers the top of the positive lead terminal 22P of the electric cell 21 in the fourth tier protrudes inward at the width center position of the upper edge of the side lid 95.

A pair of front and rear terminal blocks 97 that respectively allow insertion of and receive the negative plate 35N of the negative bus bar 30N and the positive plate 35P of the positive bus bar 30P that protrude from the left side of the stack 10 are formed on the outer surface of the side lid 95.

A lead-out hole 98 from which the voltage detection lines pulled out to the left side of the stack 10 are led to the outside is cut out at a front end position at the lower edge of the side lid 95.

An insulating wall 99 that insulates the positive plate 35P and the negative plate 35N if a metal plate falls on these electrodes is provided so as to protrude at a position between the two terminal blocks 97 on the outer surface of the side lid 95. A pair of inwardly protruding front and rear locking pawls 100 are formed at each of the upper and lower edges of the side lid 95. The locking pawls 100 on the upper side can enter the bottom surface of the left side edge of the top lid 90 and be locked to locking grooves 94 formed along the left side edge, whereas the locking pawls 100 on the lower side can enter the top at the left side edge of the bottom of the case body 81 and be locked to locking grooves 87 formed along the left side edge.

Subsequently, an exemplary procedure for assembling the battery module M will be described.

First, the battery unit 20 is formed for each tier. As shown in FIG. 12, for the battery unit 20A in the first tier, the negative bus bar 30N and the voltage detection terminal 40 are mounted to the first separator 50A, and the fuse 45 is mounted and connected to the voltage detection terminal 40. The first separator 50A is attached to the left side edge of the heat transfer plate 25, and the second separator 50B in an empty state is attached to the right side edge thereof. Then, the electric cell 21 is placed in a predetermined orientation on the heat transfer plate 25. At this time, as shown in FIG. 14, on the first separator 50A, the downwardly bent welding portion 23 of the negative lead terminal 22N of the electric cell 21 is overlapped with the outer surfaces of the welding portion 44 of the voltage detection terminal 40 and the welding portion 37 of the negative bus bar 30N that are disposed in alignment in the front-rear direction. The positive lead terminal 22P is received by the second separator 50B, and the upwardly bent welding portion 23 thereof is disposed standing upright at a position located substantially along the right side surface of the second separator 50B (see FIG. 11).

Figure 17:
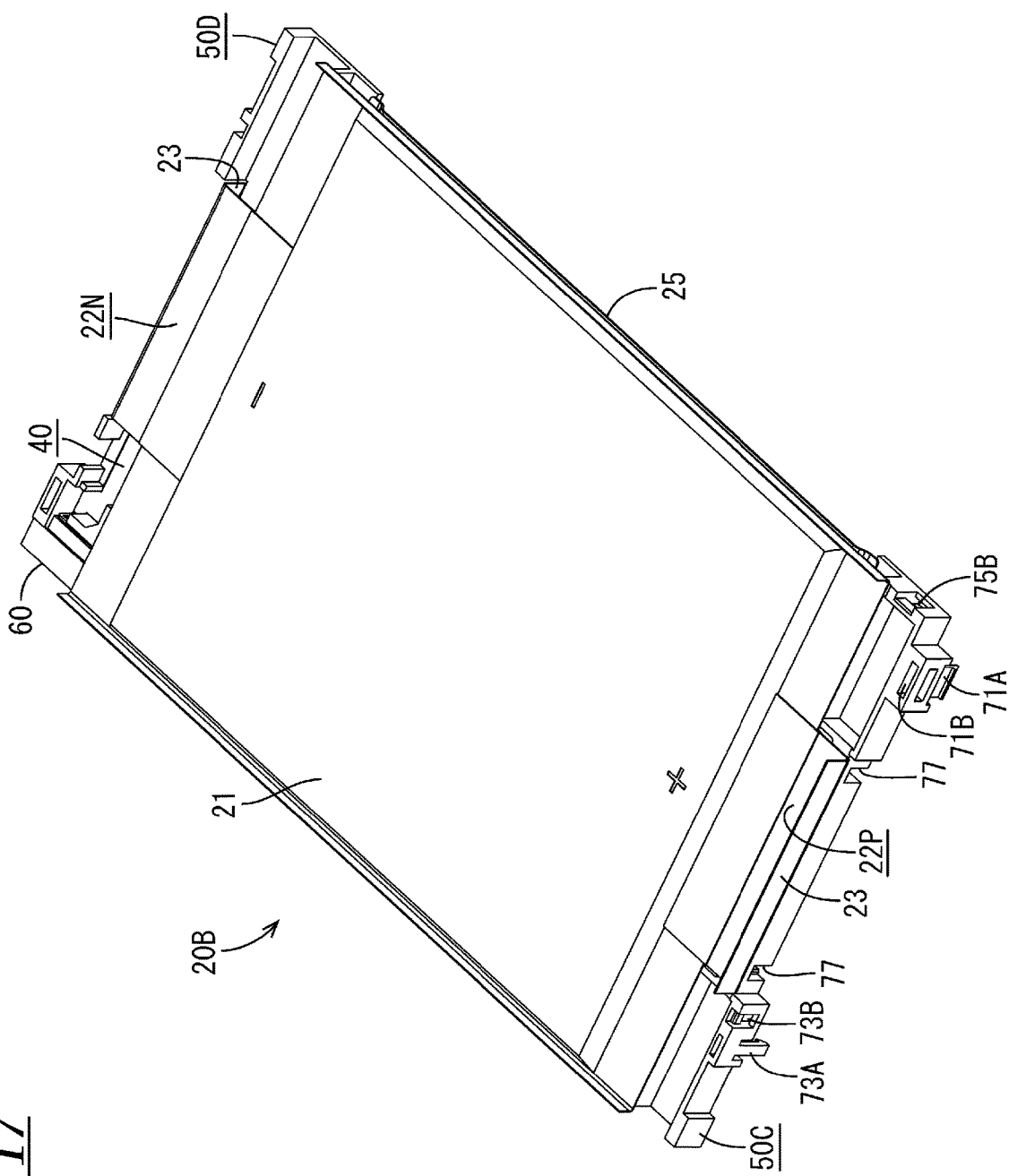
FIG. 17 is a perspective view of a battery unit in a second tier.
Figure 18:
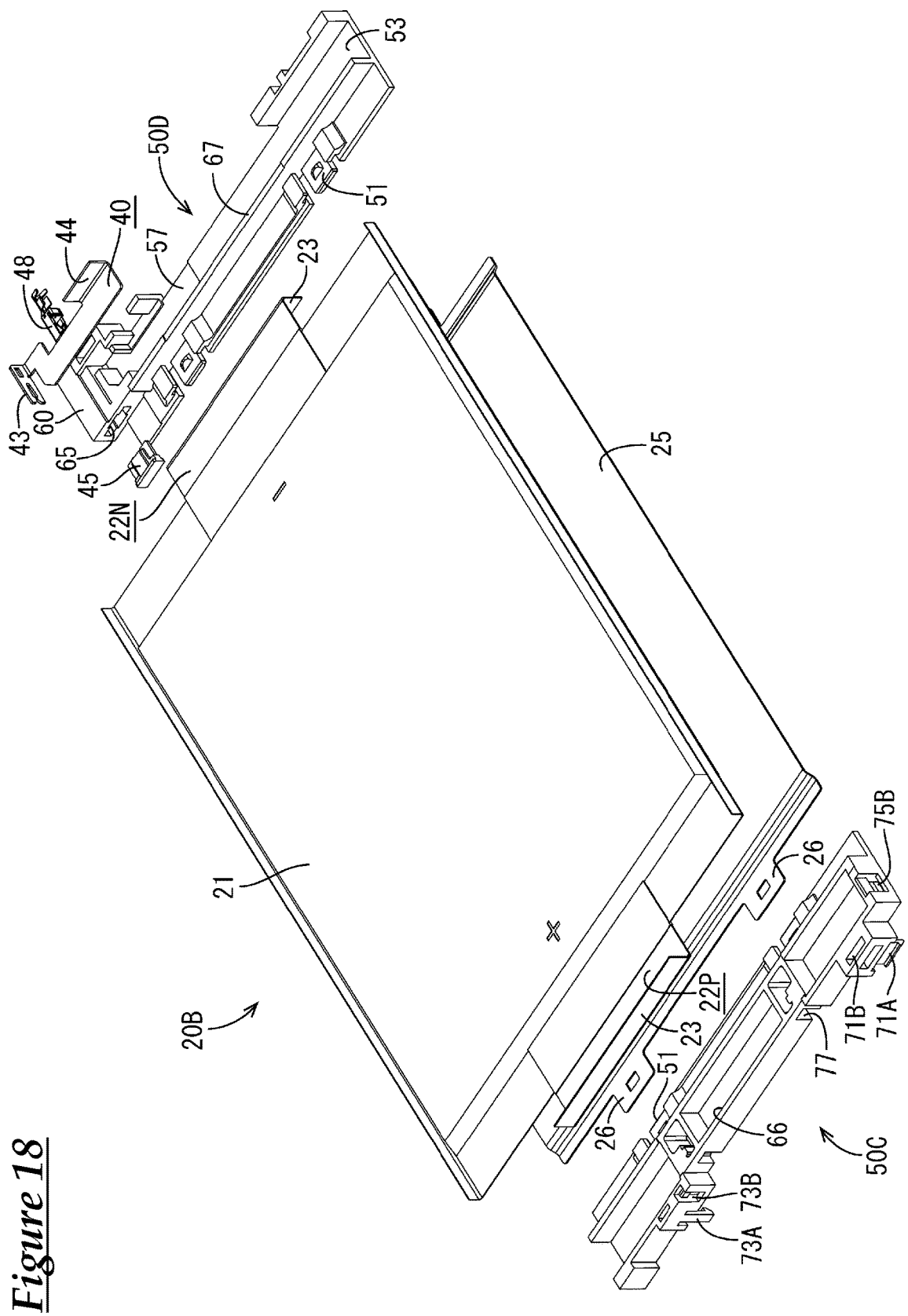
FIG. 18 is an exploded perspective view of the battery unit in the second tier.
Figure 19:
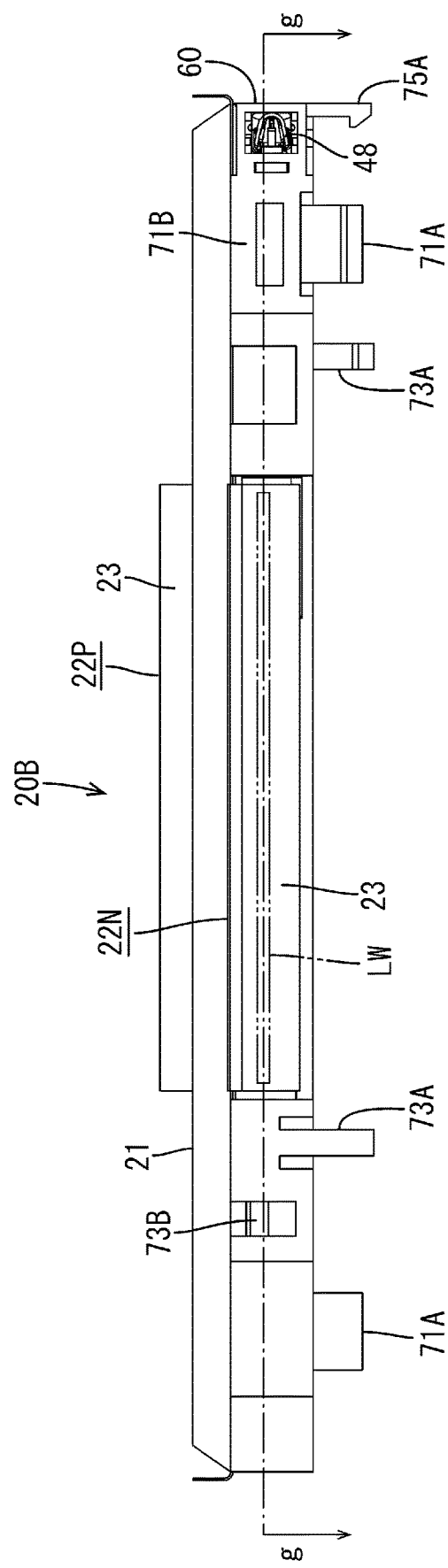
FIG. 19 is a right side view of the battery unit in the second tier.

As shown in FIG. 18, for the battery unit 20B in the second tier, the voltage detection terminal 40 and the fuse 45 are mounted to the fourth separator 50D on the right side. The fourth separator 50D is attached to the right side edge of the heat transfer plate 25, and the third separator 50C in an empty state is attached to the left side edge thereof. Then, when the electric cell 21 is placed in a predetermined orientation on the heat transfer plate 25, the positive lead terminal 22P of the electric cell 21 is received by the third separator 50C, and the upwardly bent welding portion 23 thereof is disposed standing upright at a position located substantially along the left side of the third separator 50C, as shown in FIG. 17. On the other hand, as shown in FIG. 20, on the fourth separator 50D, the downwardly bent welding portion 23 of the negative lead terminal 22N is overlapped with the outer surface of the welding portion 44 of the voltage detection terminal 40.

The battery unit 20C in the third tier is applied in a configuration in which the battery unit 20B in the second tier assembled in the above-described manner has an opposite orientation with respect to the horizontal direction (i.e. is laterally reversed).

As shown in FIG. 22, for the battery unit 20D in the fourth tier, the positive bus bar 30P, the voltage detection terminal 40, and the fuse 45 are mounted to the fifth separator 50E, and the voltage detection terminal 40 and the fuse 45 are mounted to the fourth separator 50D. The fifth separator 50E is attached to the left side edge of the heat transfer plate 25, and the fourth separator 50D is attached to the right side edge thereof. Then, the electric cell 21 is placed in a predetermined orientation on the heat transfer plate 25. At this time, as shown in FIG. 24, on the fifth separator 50E, the downwardly bent welding portion 23X of the positive lead terminal 22P of the electric cell 21 is overlapped with the outer surfaces of the welding portion 44 of the voltage detection terminal 40 and the welding portion 37 of the negative bus bar 30N that are disposed in alignment in the front-rear direction. On the other hand, on the fourth separator 50D, the downwardly bent welding portion 23 of the negative lead terminal 22N is overlapped with the outer surface of the welding portion 44 of the voltage detection terminal 40.

When the battery units 20 in the respective tiers have been formed in the above-described manner, the battery units 20 are disposed as shown in FIG. 4 and stacked in the up-down direction. Specifically, the electric cells 21 in the respective tiers are overlapped with one another with the heat transfer plate 25 interposed therebetween, and the separators 50 in the respective tiers are overlapped with one another on the left and right sides, and are coupled via the first to third locking portions 70, 72, and 74. That is, the battery units 20 in four tiers are stacked and coupled (FIG. 3).

Figure 7:
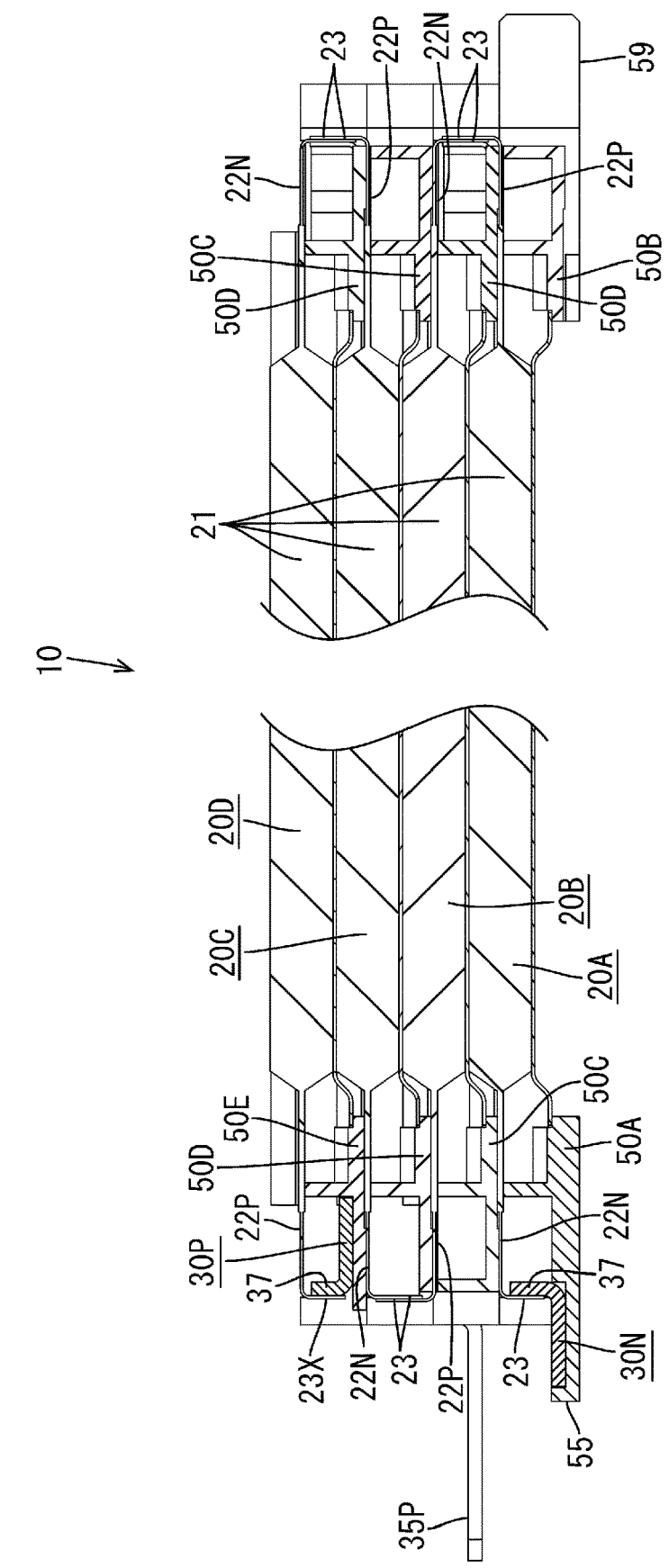
FIG. 7 is a partially cutout enlarged cross-sectional view taken along the line b-b in FIG. 5.
Figure 8:
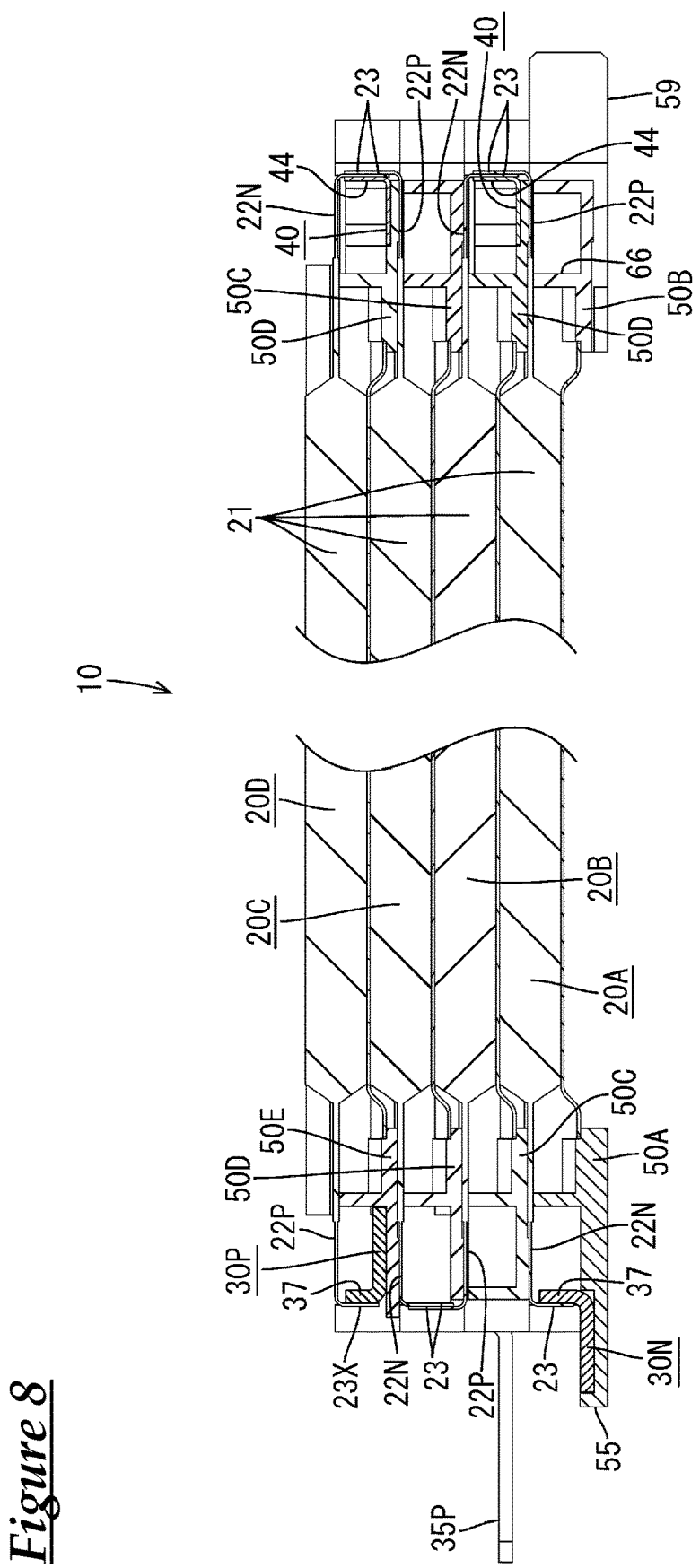
FIG. 8 is a partially cutout enlarged cross-sectional view taken along the line c-c in FIG. 5
Figure 9:
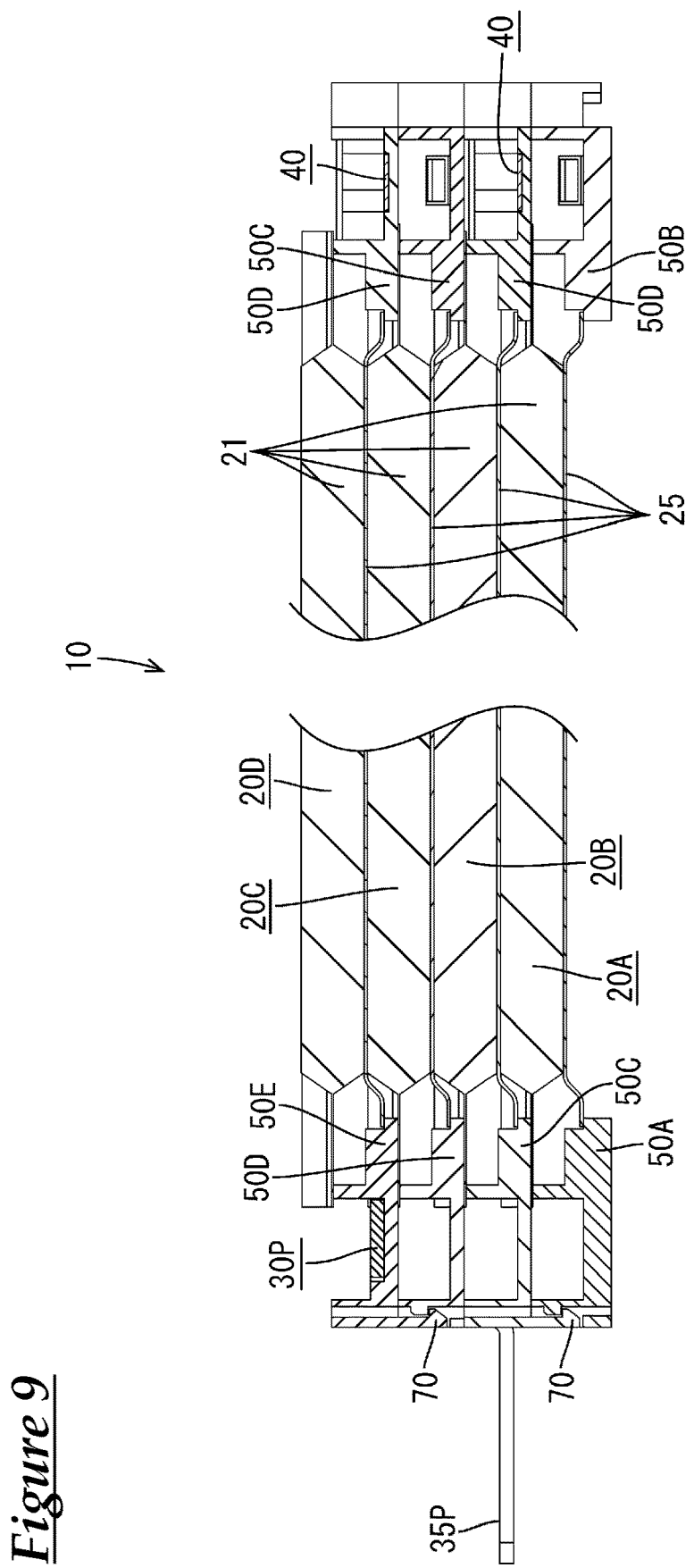
FIG. 9 is a partially cutout enlarged cross-sectional view taken along the line d-d in FIG. 5.

Consequently, as shown in FIG. 7, on the right side surface of the fourth separator 50D on the right side of the battery unit 20B in the second tier, the upward welding portion 23 of the positive lead terminal 22P of the electric cell 21 in the first tier overlaps the outer surface of the downward welding portion 23 of the negative lead terminal 22N of the electric cell 21 in the second tier. Likewise, on the left side of the fourth separator 50D on the left side of the battery unit 20C in the third tier, the upward welding portion 23 of the positive lead terminal 22P of the electric cell 21 in the second tier overlaps the outer surface of the downward welding portion 23 of the negative lead terminal 22N of the electric cell 21 in the third tier. Further, on the right side surface of the fourth separator 50D on the right side of the battery unit 20D in the fourth tier, the upward welding portion 23 of the positive lead terminal 22P of the electric cell 21 in the third tier overlaps the outer surface of the downward welding portion 23 of the negative lead terminal 22N of the electric cell 21 in the fourth tier.

When the battery units 20 in the four tiers have been stacked and coupled in this manner, the lead terminals 22, the voltage detection terminal 40, and optionally the bus bar 30, are connected by laser welding for each tier.

Specifically, as shown in FIG. 14, on the left side of the first separator 50A on the left side of the battery unit 20A in the first tier, the welding portion 44 of the voltage detection terminal 40 and the welding portion 37 of the negative bus bar 30N overlap, in alignment in the front-rear direction, the inner surface of the welding portion 23 of the negative lead terminal 22N of the electric cell 21 in the first tier. Accordingly, by applying laser light so as to run in the front-rear direction toward the welding portion 23 of the negative lead terminal 22N (see a laser welding portion LW shown in FIG. 13), the welding portion 44 of the voltage detection terminal 40 and the welding portion 37 of the negative bus bar 30N are welded in alignment to the inner surface of the welding portion 23 of the negative lead terminal 22N. As a result, the voltage detection terminal 40 and the negative bus bar 30N are collectively connected electrically to the negative lead terminal 22N of the electric cell 21 in the first tier.

As shown in FIG. 20, on the right side surface of the fourth separator 50D on the right side of the battery unit 20B in the second tier, the welding portion 23 of the negative lead terminal 22N of the electric cell 21 in the second tier overlaps the inner surface of the welding portion 23 of the positive lead terminal 22P of the electric cell 21 in the first tier, and the welding portion 44 of the voltage detection terminal 40 further overlaps the inner surface thereof. Accordingly, by similarly applying laser light so as to run in the front-rear direction toward the welding portion 23 of the positive lead terminal 22P (see a laser welding portion LW in FIG. 19), the welding portions 23 of the positive lead terminal 22P and the negative lead terminal 22N are welded to each other, and the welding portion 44 of the voltage detection terminal 40 is also welded. As a result, the positive lead terminal 22P of the electric cell 21 in the first tier, the negative lead terminal 22N of the electric cell 21 in the second tier, and the voltage detection terminals 40 are collectively connected electrically.

On the left side of the fourth separator 50D on the left side of the battery unit 20C in the third tier and the right side surface of the fourth separator 50D on the right side of the battery unit 20D in the fourth tier, by performing laser welding in the same manner as described above (see a laser welding portion LW shown in FIG. 23), the positive lead terminal 22P of the electric cell 21 in the tier one tier lower than each of these tiers, the negative lead terminal 22N of the electric cell 21 in each of these tiers, and the voltage detection terminal 40 are collectively connected electrically.

On the left side of the fifth separator 50E on the left side of the battery unit 20D in the fourth tier, the welding portion 44 of the voltage detection terminal 40 and the welding portion 37 of the positive bus bar 30P overlap, in alignment in the front-rear direction, the inner surface of the downward welding portion 23X of the positive lead terminal 22P of the electric cell 21 in the fourth tier. Accordingly, by similarly performing laser welding, the voltage detection terminal 40 and the positive bus bar 30P are collectively connected electrically to positive lead terminal 22P of the electric cell 21 in the fourth tier.

When laser welding has been completed in five locations in the above-described manner, the female terminals 48 connected to the terminal ends of the five voltage detection lines that had been prepared are finally inserted and retained in the cavities 61 of the corresponding connector portions 60 provided in the separators 50, and at that time, also connected to the fuses 45 disposed in the back. Thus, the stack 10 is formed as shown in FIG. 3.

Note that the voltage detection lines may be connected to the fuses 45 before completion of laser welding.

In such a stack 10, the electric cells 21 stacked in four tiers are connected in series by the positive lead terminal 22P and the negative lead terminal 22N that are adjacent to each other being sequentially connected. Also, the negative bus bar 30N and the positive bus bar 30P are respectively connected to the negative lead terminal 22N and the positive lead terminal 22P located at opposite ends, and are disposed in alignment in the front-rear direction so as to protrude from the left side of the stack 10.

The voltage detection terminals 40 connected via the fuses 45 to the terminal ends of the five voltage detection lines for detecting the voltages of the electric cells 21 are respectively connected in a total of five locations, namely, at the negative lead terminal 22N of the electric cell 21 in the first tier, the lead terminal 22 connected between the electric cells 21 in the first and second tiers, the lead terminal 22 connected between the electric cells 21 in the second and third tiers, the lead terminal 22 connected between the electric cells 21 in the third and fourth tiers, and the positive lead terminal 22P of the electric cell 21 in the fourth tier.

Among the five voltage detection lines, three voltage detection lines are pulled out leftward from a front edge portion of the left side of the stack 10, and the remaining two voltage detection lines are pulled out rightward from a rear end portion of the right side surface of the stack 10.

The assembled stack 10 is accommodated in the case 80. Prior to accommodation, the insulating member 12 is mounted to the right side surface of a group of the separators 50 in four tiers on the right side of the stack 10, thus insulating and protecting the lead terminals 22 exposed on the right side surface.

The stack 10 to which the insulating member 12 has been mounted in this manner is placed into the case body 81, as shown in FIG. 2. At this time, the two voltage detection lines pulled out from the rear edge portion of the right side surface of the stack 10 are led to the outside through the lead-out hole 84 formed in the rear end of the upper edge of the right side plate 82A of the case body 81. The stack 10 is placed on the bottom surface of the case body 81 while being positioned with the contact plates 59 protruding on the right side of the second separator 50B in the first tier being in contact with the right side plate 82A, and the raised portion 83 is brought into contact with the heat transfer plate 25 in the first tier.

Subsequently, the top lid 90 is attached to the top opening of the case body 81. The top lid 90 is placed on the top opening while the insertion pieces provided on the mounting plate 92 on the rear side are inserted into the insertion grooves 85 at the upper edge portion of the rear plate 82C, and is fixed by fastening, with screws 101, the mounting plate 92 on the front side and the front plate 82B in three locations. Consequently, the depressed portion 91 is pressed against the top of the electric cell 21 in the fourth tier, and the electric cells 21 and the heat transfer plates 25 that are overlapped in four tiers are clamped between the depressed portion 91 and the raised portion 83. With such a structure, the heat generated from the electric cell 21 is transmitted to the case body 81 and the top lid 90, providing the function of releasing the heat to the outside.

When the top lid 90 is attached to the case body 81, a metal box that is open on the left surface side is formed, and finally, the side lid 95 is attached to the opening on the left surface side. The side lid 95 is placed toward the opening by holding the insulating wall 99 from a state in which the three voltage detection lines pulled out from the front edge portion of the left side of the stack 10 are fitted to the lead-out hole 98 at the lower edge of the front end. The side lid 95 is pushed in while causing the insulating plate 96 to slide onto the bottom surface of the left side edge of the top lid 90. As the pushing advances, the distal ends of the negative plate 35N of the negative bus bar 30N and the positive plate 35P of the positive bus bar 30P that protrude from the left side of the stack 10 face the terminal blocks 97, and the pairs of upper and lower locking pawls 100 enter the inside of the upper edge and the lower edge, respectively, of the opening.

The pushing is stopped when the side lid 95 has come into contact with the platform 55 protruding from the left side of the first separator 50A in the first tier, and at that time, the upper and lower locking pawls 100 are fitted to the corresponding upper and lower locking grooves 94 and 87, thus retaining and attaching the side lid 95. Here, the insulating plate 96 covers the top of the positive lead terminal 22P of the electric cell 21 in the fourth tier to protect the positive lead terminal 22P in the insulating state between the insulating plate 96 and the top lid 90, and the negative plate 35N and the positive plate 35P protrude onto the front and rear terminal blocks 97 by a predetermined amount. In addition, the three voltage detection lines are led out from the lead-out hole 98.

Thus, the assembly of the battery module M is completed, as shown in FIG. 1.

In use, to the positive and negative plates 35P and 35N of the thus assembled battery module M, connection terminals provided at the terminal end of a power line (not shown) are connected by bolting on the terminal blocks 97, and the lead-out end sides of the voltage detection lines are connected to a voltage detection portion of a control unit via connectors or the like.

According to the battery module M of the present embodiment, the following effects can be achieved.

To form the stack 10, it is necessary to appropriately connect the lead terminals 22, the bus bars 30, and the voltage detection terminals 40 in a plurality of predetermined locations. Specifically, in three locations, namely, the right side of the battery unit 20B in the second tier, on the left side of the battery unit 20C in the third tier, and the right side of the battery unit 20D in the fourth tier, it is necessary to connect the voltage detection terminals 40, in addition to connecting the positive and negative lead terminals 22P and 22N to each other. These connections are collectively performed by laser welding. In two locations, namely, on the left side of the battery unit 20A in the first tier and the left side of the battery unit 20D in the fourth tier, it is necessary to connect the bus bars 30 to the lead terminals 22, in addition to the voltage detection terminals 40. These connections are also collectively performed by laser welding.

In particular, in locations where the connection of the bus bar 30 is necessary, or in other words, locations where the connection of three types of conductors is necessary, the bus bar 30 can be connected to the corresponding lead terminal 22, collectively with the voltage detection terminal 40. Accordingly, the connection step, or in other words, the formation step of the stack 10 is simplified, thus making it possible to shorten the manufacturing process of the battery module M and contribute to the reduction in the manufacturing costs.

In the locations where the three types of conductors are connected, the lead terminals 22, the bus bars 30, and the welding portions 23, 37, and 44 of the voltage detection terminals 40 can be held on the separator 50 so as to be normally overlapped. Accordingly, the subsequent laser welding operation can be further smoothly performed.

To connect the voltage detection terminal 40 to the terminal end of the voltage detection line, a structure in which the fuse 45 is interposed therebetween is used. Accordingly, if an excessively large current is about to flow to the voltage detection line for some reasons, this can be prevented.

The technology disclosed herein is not limited to the embodiment described by the above statements and drawings, and, for example, the following embodiments also fall within the technical scope.

The battery module assembly procedure illustrated in the above embodiment is merely an example, and may be changed as appropriate.

The above embodiment illustrates a case where the collective connection of the lead terminals, the bus bars, and the voltage detection terminals by laser welding is performed on the separators. However, the present disclosure is not limited thereto, and the connection can be performed by using separate jigs.

The above embodiment illustrates a case where the voltage detection line and the corresponding voltage detection terminal are attached to the separator with the fuse interposed therebetween. However, the fuse may be provided at a separate location, and it is also possible to adopt a structure in which no fuse is provided.

Although the above embodiment shows a laminated cell as the electricity storage element, the electricity storage element may be a battery or the like that includes power generating elements accommodated in a metal battery case.

Although the above embodiment shows an example in which the electricity storage element is used as a battery module for an ISG the electricity storage element may be used as a battery module for another use.

Although the above embodiment illustrates a case where the number of stacked electric cells is four, any plural number of (two or more) electric cells may be stacked.

Furthermore, the electricity storage element is not limited to a battery, and may be another electricity storage element such as a capacitor.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

M Battery module (electricity storage module)
10 Stack
21 Electric cell (electricity storage element)
22, 22P, 22N Lead terminal
23, 23X Welding portion
30, 30P, 30N Bus bar
37 Welding portion
40 Voltage detection terminal
44 Welding portion
45 Fuse
50, 50A, 50E Separator
LW Laser welding portion

The invention claimed is:

1. An electricity storage module comprising:
a plurality of electricity storage elements, each of the electricity storage elements has a horizontally elongated rectangular shape and includes a first end portion, a second end portion, a first flat side, and a second flat side, the first and second end portions of each electricity storage element are located on opposite ends and are separated in a horizontal direction, the first and second flat sides of each electricity storage element are located on opposite sides and are separated in a thickness direction;
a plurality of positive and negative lead terminals, in each electricity storage element, a positive lead terminal protrudes outward from one of the first or second end portions and a negative lead terminal protrudes outward from the other of the first or second end portions;
a stack in which the plurality of electricity storage elements are stacked in the thickness direction, for adjacent stacked electricity storage elements, the lead terminals of one electricity storage element are connected to the lead terminals of opposite polarities of the other electricity storage element;
bus bars that are individually connected to those of the lead terminals connected in order that are located at opposite ends and that have mutually opposite polarities; and
voltage detection terminals that are connected to terminal ends of voltage detection lines and individually connected to the electricity storage elements;
wherein the plurality of electricity storage elements are stacked in such a manner that a plurality of opposite polarity lead terminals, the bus bars, and the voltage detection terminals extend from one of the first or second end portions and overlap one another so as to be collectively connected by laser welding.

2. The electricity storage module according to claim 1, further comprising an insulating separator that is interposed between adjacent ones of the lead terminals, and the bus bars and the voltage detection terminals can be mounted to the separator so as to be positioned at a position that overlaps welding portions respectively provided at the lead terminals.

3. The electricity storage module according to claim 1, wherein the voltage detection lines and the voltage detection terminals are connected via fuses.

\* \* \* \* \*